US00RE49534E

(19) United States
(12) Reissued Patent
Oakey et al.

(10) Patent Number: US RE49,534 E
(45) Date of Reissued Patent: *May 23, 2023

(54) BORDER, EDGE OR PATTERN CARPET TILE DESIGN, MANUFACTURE AND INSTALLATION

(71) Applicant: Interface, Inc., Atlanta, GA (US)

(72) Inventors: David D. Oakey, Atlanta, GA (US); Carson Machell-Archer, West Point, GA (US); Sydney D. Daniel, LaGrange, GA (US)

(73) Assignee: Interface, Inc., Atlanta, GA (US)

( * ) Notice: This patent is subject to a terminal disclaimer.

(21) Appl. No.: 17/222,860

(22) Filed: Apr. 5, 2021

Related U.S. Patent Documents

Reissue of:
(64) Patent No.: 9,211,024
Issued: Dec. 15, 2015
Appl. No.: 13/986,519
Filed: May 10, 2013

U.S. Applications:
(63) Continuation of application No. 15/731,311, filed on May 22, 2017, now Pat. No. Re. 48,544, which is an application for the reissue of Pat. No. 9,211,024.
(Continued)

(51) Int. Cl.
*A47G 27/04* (2006.01)
*A47G 27/02* (2006.01)
(Continued)

(52) U.S. Cl.
CPC ..... *A47G 27/0481* (2013.01); *A47G 27/0275* (2013.01); *A47G 27/0293* (2013.01);
(Continued)

(58) Field of Classification Search
CPC ..... A47G 27/0481; A47G 27/0275; A47G 27/0293; A47G 27/0475; D05C 15/26;
(Continued)

(56) References Cited

U.S. PATENT DOCUMENTS 2,020,699 A 11/1935 Patrick
2,715,289 A 8/1955 Gale
(Continued)

FOREIGN PATENT DOCUMENTS

CN 301837107 2/2012
CN 202375833 8/2012
(Continued)

OTHER PUBLICATIONS

"Photograph of Installation of Printed Carpet Tiles", Believed to Be Publicly Available at Least as Early, 2020.
(Continued)

*Primary Examiner* — Norca L. Torres Velazquez
(74) *Attorney, Agent, or Firm* — Kilpatrick Townsend & Stockton LLP

(57) ABSTRACT

Design and manufacture of tufted articles, carpet tile webs and carpet tiles, and installation of carpet tiles, having different color, pile height, pile texture or other characteristics that, together with similar other such tiles, may be installed to create borders, edges or other multiple-tile designs, usually without any of the tiles looking out of place or improperly oriented relative to nap or the direction the tile is "facing."

20 Claims, 27 Drawing Sheets
(25 of 27 Drawing Sheet(s) Filed in Color)

Related U.S. Application Data

(60) Provisional application No. 61/688,242, filed on May 10, 2012.

(51) Int. Cl.

| | |
|---|---|
| ***D05C 15/26*** | (2006.01) |
| ***D05C 17/02*** | (2006.01) |
| ***D06N 7/00*** | (2006.01) |
| ***B44F 1/08*** | (2006.01) |
| ***E04F 15/02*** | (2006.01) |

(52) U.S. Cl.
CPC ..... *A47G 27/0475* (2013.01); *D05C 15/26* (2013.01); *D05C 17/02* (2013.01); *D06N 7/0065* (2013.01); *B44F 1/08* (2013.01); *D06N 7/006* (2013.01); *E04F 15/02* (2013.01)

(58) Field of Classification Search
CPC ..... D05C 17/02; D06N 7/0065; D06N 7/006; B44F 1/08; E04F 15/02
See application file for complete search history.

(56) References Cited

U.S. PATENT DOCUMENTS

| | | | | |
|---|---|---|---|---|
| 2,755,506 | A * | 7/1956 | Weber | 264/176.1 |
| 2,763,587 | A | 9/1956 | Masland, Jr. | |
| 3,849,157 | A * | 11/1974 | Palmer et al. | 8/497 |
| 3,850,783 | A * | 11/1974 | Peters et al. | 428/89 |
| 3,875,716 | A | 4/1975 | Eusemann | |
| 4,443,505 | A * | 4/1984 | Ehrenfeld, Jr. | 428/89 |
| 4,546,025 | A | 10/1985 | Vaisman | |
| 4,576,848 | A | 3/1986 | Dillon et al. | |
| 4,659,602 | A * | 4/1987 | Birch | 428/88 |
| 5,190,821 | A * | 3/1993 | Goodall et al. | 428/398 |
| 6,182,708 | B1 | 2/2001 | Smissaert | |
| 6,305,688 | B1 | 10/2001 | Waroway | |
| 6,790,042 | B2 | 9/2004 | Worth | |
| 6,841,216 | B2 | 1/2005 | Daniel | |
| 6,861,118 | B2 | 3/2005 | Kobayashi et al. | |
| 6,890,615 | B2 | 5/2005 | Horwich et al. | |
| 6,908,656 | B2 * | 6/2005 | Daniel et al. | 428/88 |
| 6,945,007 | B2 | 9/2005 | Kobayashi et al. | |
| 6,990,703 | B2 | 1/2006 | Brown et al. | |
| 7,070,846 | B2 | 7/2006 | Beistline et al. | |
| 7,182,989 | B2 | 2/2007 | Higgins | |
| 7,243,513 | B2 | 7/2007 | Kohlman et al. | |
| 7,297,385 | B2 | 11/2007 | Daniel | |
| 7,350,443 | B2 | 4/2008 | Oakey et al. | |
| 7,601,413 | B2 * | 10/2009 | Daniel et al. | 428/88 |
| 7,921,789 | B2 | 4/2011 | Bailey et al. | |
| 8,082,057 | B2 | 12/2011 | Allen et al. | |
| 8,145,345 | B2 | 3/2012 | Magee et al. | |
| 8,155,776 | B2 | 4/2012 | Bittner et al. | |
| 8,361,581 | B2 | 1/2013 | Tick et al. | |
| 8,365,491 | B2 | 2/2013 | Schrunk | |
| 8,418,588 | B2 | 4/2013 | Tick et al. | |
| 8,644,976 | B2 | 2/2014 | Bittner et al. | |
| 8,655,473 | B2 | 2/2014 | Magee et al. | |
| 8,697,224 | B2 | 4/2014 | Kato et al. | |
| 8,943,772 | B2 | 2/2015 | Schrunk | |
| 9,060,623 | B2 | 6/2015 | Magee et al. | |
| 9,066,614 | B2 | 6/2015 | Bittner et al. | |
| 9,211,024 | B2 | 12/2015 | Oakey et al. | |
| 9,332,870 | B1 | 5/2016 | Burgess et al. | |
| 9,332,871 | B1 | 5/2016 | Burgess et al. | |
| 9,351,598 | B2 | 5/2016 | Tick et al. | |
| 9,534,398 | B2 | 1/2017 | Rainey | |
| 9,622,609 | B2 | 4/2017 | Duncan et al. | |
| RE48,544 | E | 5/2021 | Oakey et al. | |
| 2002/0092261 | A1 | 7/2002 | Rockwell et al. | |
| 2002/0124513 | A1 | 9/2002 | Desai | |
| 2003/0143359 | A1 | 7/2003 | Daniel et al. | |
| 2003/0170420 | A1 | 9/2003 | Higgins | |
| 2003/0190450 | A1 | 10/2003 | Daniel et al. | |
| 2003/0211274 | A1 | 11/2003 | Daniel et al. | |
| 2004/0043183 | A1 | 3/2004 | Thrasher et al. | |
| 2006/0040089 | A1 | 2/2006 | Daniel et al. | |
| 2006/0093994 | A1 | 5/2006 | Grant | |
| 2006/0251846 | A1 * | 11/2006 | Daniel et al. | 428/44 |
| 2006/0275578 | A1 | 12/2006 | Jones | |
| 2007/0178286 | A1 | 8/2007 | Borlenghi | |
| 2007/0207286 | A1 * | 9/2007 | Craig et al. | 428/89 |
| 2007/0298209 | A1 * | 12/2007 | Kohlman et al. | 428/95 |
| 2008/0041286 | A1 | 2/2008 | Tick et al. | |
| 2008/0176019 | A1 * | 7/2008 | Bragdon | 428/44 |
| 2008/0249794 | A1 | 10/2008 | Bradford et al. | |
| 2009/0145534 | A1 | 6/2009 | Weiner | |
| 2009/0202778 | A1 | 8/2009 | McGee | |
| 2009/0220727 | A1 * | 9/2009 | Daniel et al. | 428/88 |
| 2009/0304974 | A1 | 12/2009 | Tick et al. | |
| 2010/0330327 | A1 | 12/2010 | Oakey et al. | |
| 2011/0107720 | A1 | 5/2011 | Oakey et al. | |
| 2011/0126483 | A1 | 6/2011 | Garcia Dorado | |
| 2012/0024210 | A1 | 2/2012 | Hase | |
| 2012/0233951 | A1 | 9/2012 | Phillips | |
| 2013/0216763 | A1 | 8/2013 | Oakey et al. | |
| 2013/0230681 | A1 * | 9/2013 | Duncan | A47G 27/0275 428/44 |
| 2013/0230682 | A1 | 9/2013 | Duncan et al. | |
| 2013/0298491 | A1 | 11/2013 | Oakey et al. | |
| 2014/0037885 | A1 | 2/2014 | Oakey | |
| 2016/0215426 | A1 | 7/2016 | Burgess et al. | |
| 2017/0175399 | A1 | 6/2017 | Rainey | |
| 2017/0280907 | A1 | 10/2017 | Duncan et al. | |

FOREIGN PATENT DOCUMENTS

| | | |
|---|---|---|
| DE | 10218966 | 11/2003 |
| EP | 1515839 | 3/2005 |
| GB | 1379902 | 1/1975 |
| JP | 2008086482 | 4/2008 |
| JP | 2008088676 | 4/2008 |
| JP | 5051823 | 8/2012 |
| WO | 03103944 | 12/2003 |
| WO | 2010144897 | 12/2010 |

OTHER PUBLICATIONS

U.S. Appl. No. 13/986,519, Non-Final Office Action, dated Oct. 29, 2014, 9 pages.

U.S. Appl. No. 13/986,519, Notice of Allowance, dated Jul. 24, 2015, 5 pages.

U.S. Appl. No. 13/986,519, Notice of Allowance, dated Apr. 16, 2015, 7 pages.

U.S. Appl. No. 15/731,311, Non-Final Office Action, dated May 1, 2020, 13 pages.

U.S. Appl. No. 15/731,311, Notice of Allowance, dated Dec. 22, 2020, 7 pages.

* cited by examiner

BORDER, EDGE OR PATTERN CARPET TILE DESIGN, MANUFACTURE AND INSTALLATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED [APPLICATION] *APPLICATIONS*

*More than one reissue application has been filed.* This application *is a continuation reissue application of U.S. Ser. No. 15/731,311, filed May 22, 2017, now allowed, which is a reissue application of U.S. Pat. No. 9,211,024, which* claims priority to U.S. Provisional Patent Application Ser. No. 61/688,242 filed May 10, 2012 and entitled Border, Edge or Pattern Carpet Tile Design, Manufacture and Installation, *all of* which [is] *are* incorporated herein in [its] *their* entirety by this reference.

FIELD OF THE INVENTION

This invention relates generally to carpet tiles and their installation and to methods of designing and manufacturing carpet tiles usable to create installations of carpet tiles with borders, edges or other multi-tile designs, including such carpet tiles that can be assembled on a floor with tiles in any appropriate location and facing in multiple directions, without any of the tiles appearing to be out of place in position or rotational orientation.

BACKGROUND OF THE INVENTION

Discernible patterns on a floor are sometimes desired for both aesthetic and functional reasons. As examples of functional reasons, discernible floor patterns can define walking paths to direct people to particular parts of a room or building, including to emergency exits. Relatively large squares, rectangles, circles and other shapes smaller than an entire room can establish intended locations on the floor of tables, chairs or other furniture or equipment or a gathering place, such as a reading group location on a classroom floor.

Large discernible patterns on a floor are also aesthetically desirable and can provide desired visual impressions, such as (a) greater or small size or room division, (b) visual organization from regimented pattern elements or (c) visual disorganization from design elements placed without discernible organization. Hospitality flooring installations often include borders and bold designs, resulting in demand for such discernible patterns in this segment of the flooring market.

U.S. Pat. No. 8,141,505 to Hall et al. ("Hall"), the entirety of which is incorporated herein by reference, describes a tufting machine and related system for controlling the machine to form "free-flowing patterns." Hall discloses a needle bar with a plurality of needles arranged across the bar. A yarn is associated with each needle. A backing material is fed under the needle bar, which is reciprocated to drive the needles through and out of the backing material to form loops of yarn in the backing material.

If the needle bar did not move laterally relative to the backing and operated as described above, the resulting product would simply consist of yarn loops extending in lines of a single color along the length of the backing material. To form a pattern with the yarn loops, it is necessary for the needle bar to shift laterally to vary the positioning of the different color yarn loops on the backing material to form a design. Hall teaches a control system that is programmed with the desired pattern information and that controls operation of the machine, including shifting of the needle bar, to create a desired pattern in the final tufted product.

Hall teaches thread-up of the needle bar with a repeating pattern of yarn colors across the needle bar. Thus, if the desired product is to have three different yarn colors (A, B, and C), those three colors would be threaded-up in the same order or sequence across the entire needle bar (i.e., ABCABCABC, etc.). Hall teaches this same thread-up methodology of a repeating sequence or pattern of the colors regardless of the number of different color yarns desired to be used. The control system must be told how many different color yarns are being used so that it can adjust the shifting of the needle bar and speed of tufting accordingly, as discussed below.

The appearance of a yarn loop on the face of a tufted product can be controlled by controlling the height of that yarn loop. Where a yarn loop of a particular color, texture or other characteristic is not to be readily visible at a particular location, that yarn loop is formed or tufted "low" in that location so that the surrounding tufted loops of a different color or other characteristic that are to be visible are higher and thus more clearly visible.

Hall controls the visibility of yarn loops on a tufted product by controlling the tension placed on the yarn to either "pull low or backrob" a yarn loop. According to applicants' understanding, to "pull low" the yarn loop is first tufted to a tuft height and then partially pulled back through the backing material so as to form a lower height yarn loop extending from the backing material. To "backrob," the yarn loop is first tufted and then pulled entirely from the face of the backing material. Some such loops are pulled entirely free of the backing, but others are left sufficiently embedded in the backing to "tack" the yarn in place on the backside of the backing. In this way, the backrobbed yarn loops are not visible at all on the face side of the backing material.

The implementation of pulling low or backrobbing results in a tufted product having a smaller amount of visible yarn on its face. To compensate for this, Hall teaches that the density of the yarn loops provided within a given length of the backing material must be increased. To achieve this, the machine must be operated at an increased or denser "stitch rate" (which Hall defines as the number of stitches per inch). Operation of the machine at a denser stitch rate slows the speed at which tufted fabric can be produced. For a given tufting bar reciprocation rate, the denser the stitch rate required, the slower the backing material can be fed through and tufted by the machine, and thus the slower the machine can be run.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Carpet tiles or modules are typically square or rectangular and are installed abutting each other to provide a carpeted room or portion of a room, corridor or other floor space. Carpet tiles are typically manufactured by manufacturing a carpet tile "web," often about six feet or two meters wide. Although other techniques are also used, carpet tile webs are usually "tufted." In tufted carpet tile, loops or "tufts" of carpet yarn are inserted in a suitable sheet of backing material as the backing is advanced through a tufting machine. Secondary backing materials are then applied to the underside of the tufted carpet tile web, and the backed web is then cut into carpet tiles of suitable size and shape. Many such tiles are either eighteen inches or one-half meter square.

This invention provides carpet tiles and methods of making carpet tiles that generally obviate the need to orient the tiles (with respect to nap) relative to each other, permitting the tiles to be installed randomly or in any chosen pattern without any tiles looking out of place relative to nap. Some or all of the tiles may also carry relatively bold or prominent visual elements that can be positioned in locations on a floor that create a wide variety of highly discernible visual patterns, particularly including borders, edges and other pattern elements that may span (or be produced by) more than one tile. Other of the tiles may carry relatively less prominent visual elements that may form a "field" area in an installation using tiles having (a) bold visual elements together with (b) tiles having relatively less prominent visual elements, and, in some instances with (c) tiles having both bold (and prominent) and less bold (and less prominent) visual elements.

Furthermore, tiles manufactured in accordance with aspects of this invention can include tiles faces or portions of faces that feel different under foot or sound different when walking. Through the use of such tiles, tile assemblies can be installed that have borders, edges and other pattern elements discernible in ways other than visually or in ways in addition to visually.

All of the different carpet tiles to be used in a particular tile assembly in accordance with some embodiments of this invention can be manufactured from the same tufted web using the same carpet yarns.

The Hall tufting machine provides capabilities previously unavailable, including the ability to produce carpet face yarn patterns with any of a number of yarn colors positioned in any desired location on the tufted web and with any desired tuft height from zero (no tuft present on the carpet face) to a desired maximum tuft height, which can be substantial.

Tiles of this invention may be manufactured using tufting machines with the apparatus described in the Hall patent. The Hall apparatus (and some other tufting machines) can tuft carpet face cloth with crisp "edges" (or clear or abrupt transitions) between face elements of one yarn color, height, texture or other characteristic and adjacent elements of another yarn color, height, texture or other characteristic. Tufted face cloth with crisp "edges" between face elements of one yarn color, height, texture or other characteristic and adjacent elements of another yarn color, height, texture or other characteristic manufactured without using the Hall apparatus may exhibit "direction" or "nap" so that adjacent tiles not facing the same direction may look out of place relative to each other.

When operated according to at least portions of the methods of this invention, the Hall apparatus can also tuft carpet yarn such that the transition from a first yarn color, height, texture or other characteristic to a second yarn color, height, texture or other characteristic is "fuzzy," gradual or indistinct, meaning that across the carpet face an area has only the first yarn color, height, texture or other characteristic visible and transitions through a mixture of predominantly the first yarn color, height, texture or other characteristic to an equally balanced mixture of the first and second yarn colors, heights, textures or other characteristics to a mixture of predominantly the second yarn color, height, texture or other characteristic and ultimately to an area having only the second yarn color, height, texture or other characteristic visible. More complex transitions are also possible using three, four or more yarns that differ in color, height, texture or other characteristic.

When operated according to at least portions of the methods of this invention, the Hall apparatus can also tuft carpet yarn so that at least some carpet modules have a discernible edge that varies significantly in shape and extension and that provides a transition regions of greater width and flexibility.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
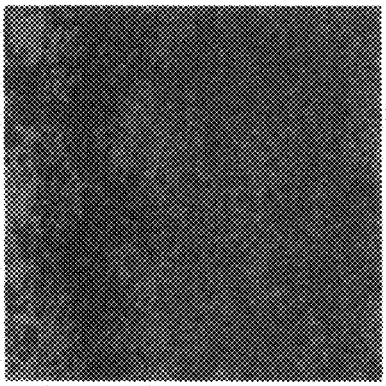
FIGS. 1, 2 and 3 are top or plan views of individual carpet tiles of this invention.
Figure 2:
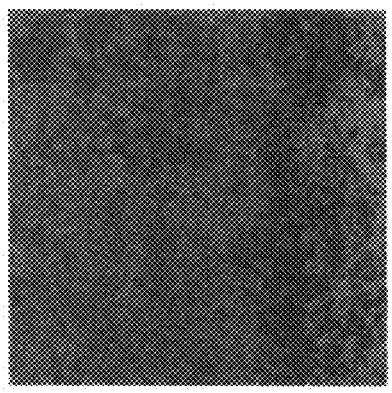
Figure 3:
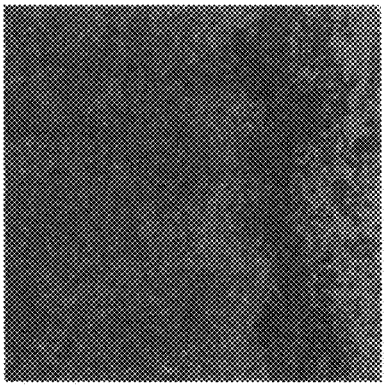
Figure 4:
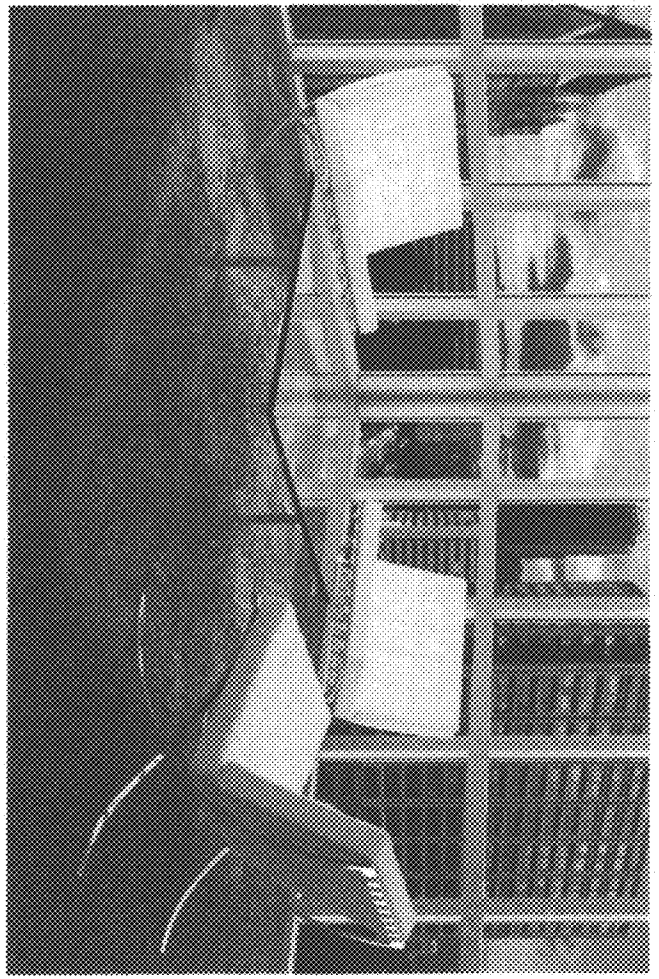
FIG. 4 is a perspective rendering of a room with a carpet tile installation in accordance with this invention.
Figure 5:
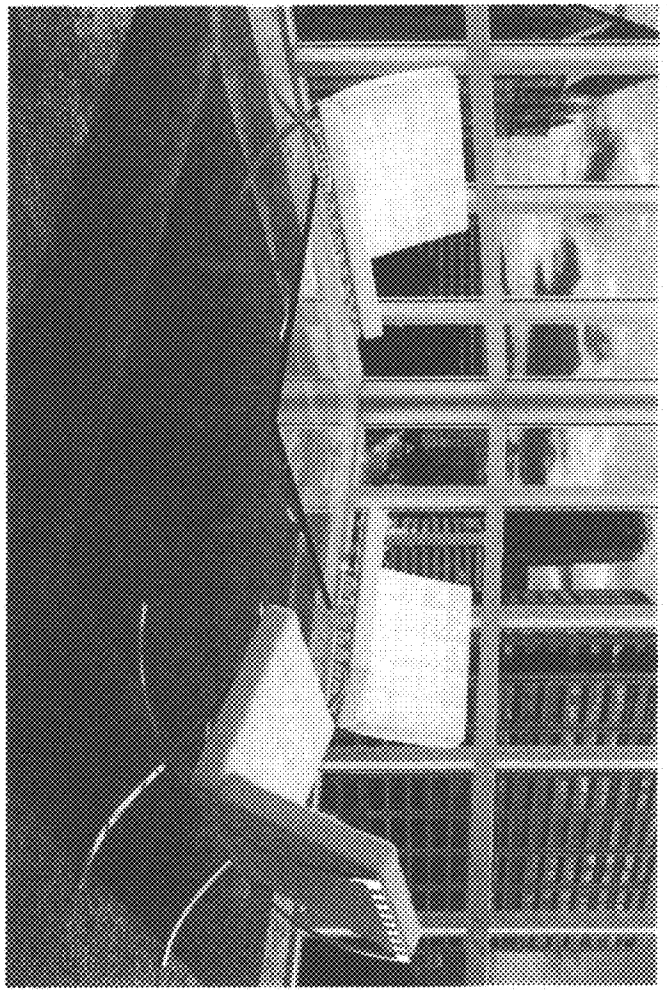
FIG. 5 is another perspective rendering of a room with another carpet tile installation in accordance with this invention.

FIGS. 1, 2 and 3 depict individual carpet tiles of embodiments of this invention that have a "moss on rock," "fuzzy" or gradual edge transition appearance.

FIG. 6-11 depict assemblies of carpet tiles of this invention, some of which having visible shapes exhibiting "crisp" and/or "fuzzy" edges.

Figure 6:
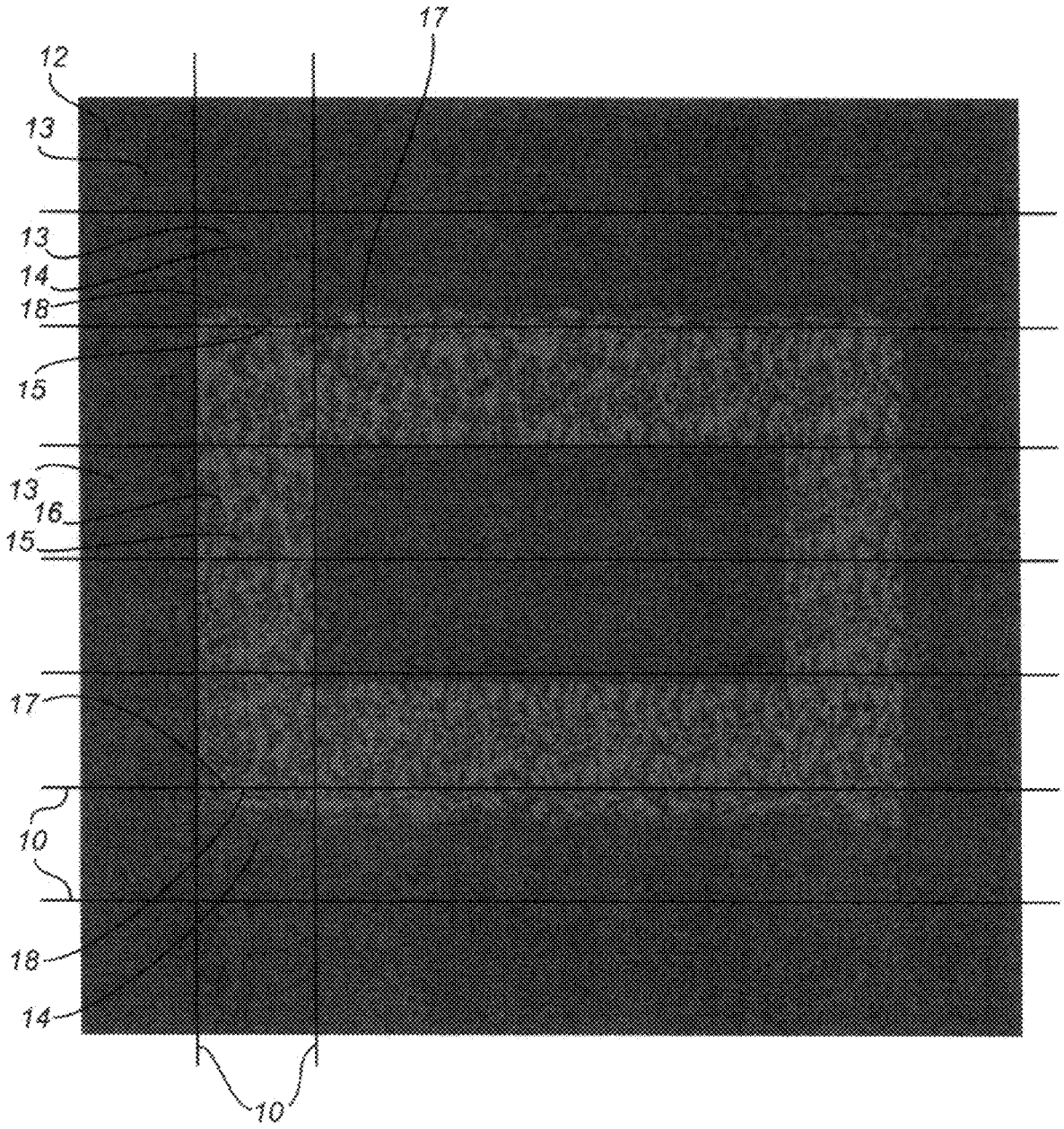
FIGS. 6-11 are top or plan views of assemblies of carpet tiles of this invention.
Figure 7:
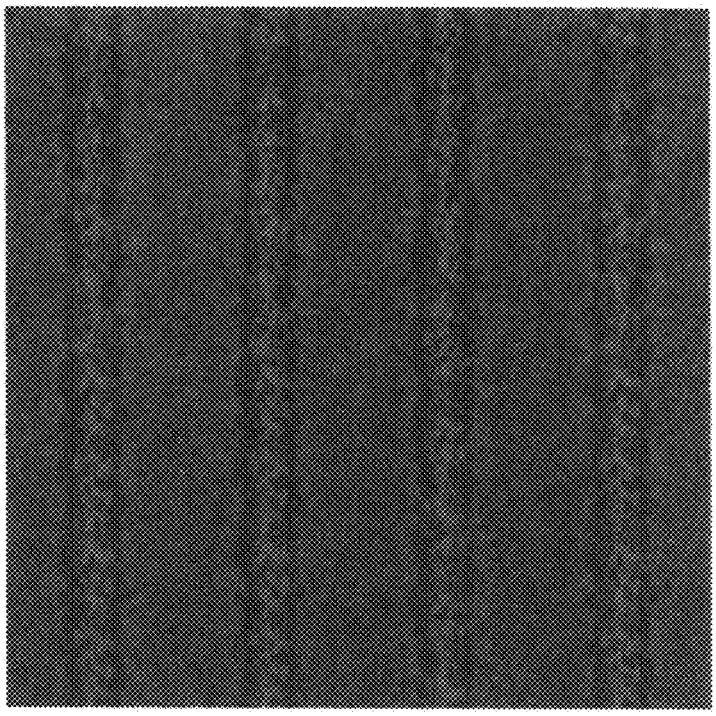
Figure 8:
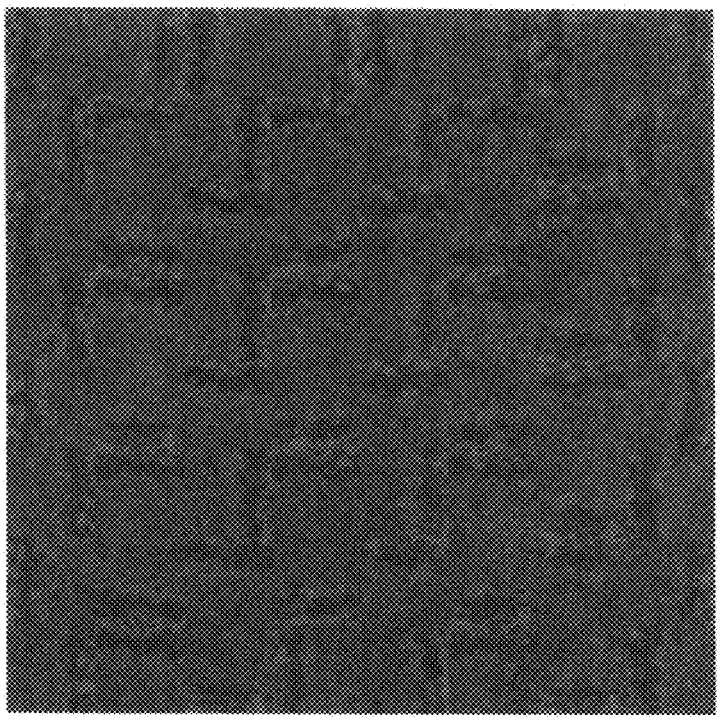
Figure 9:
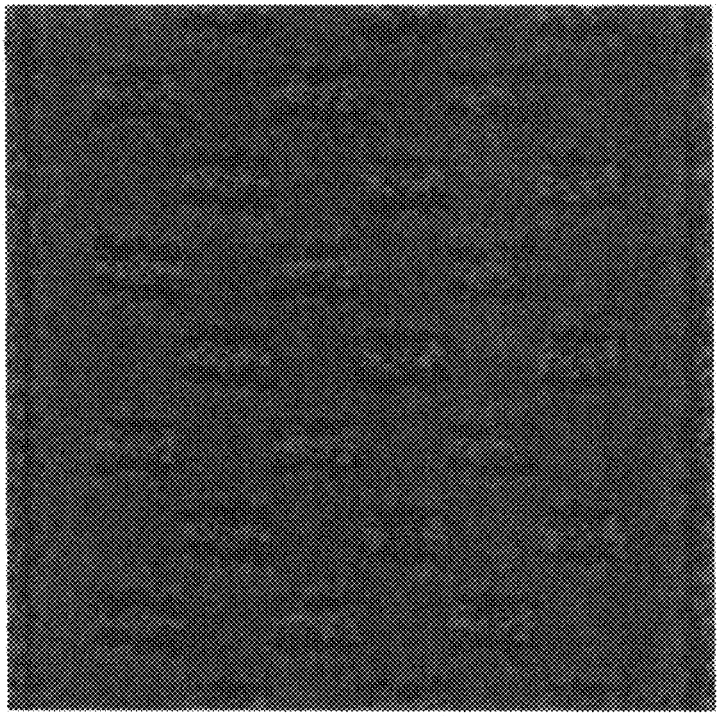
Figure 10:
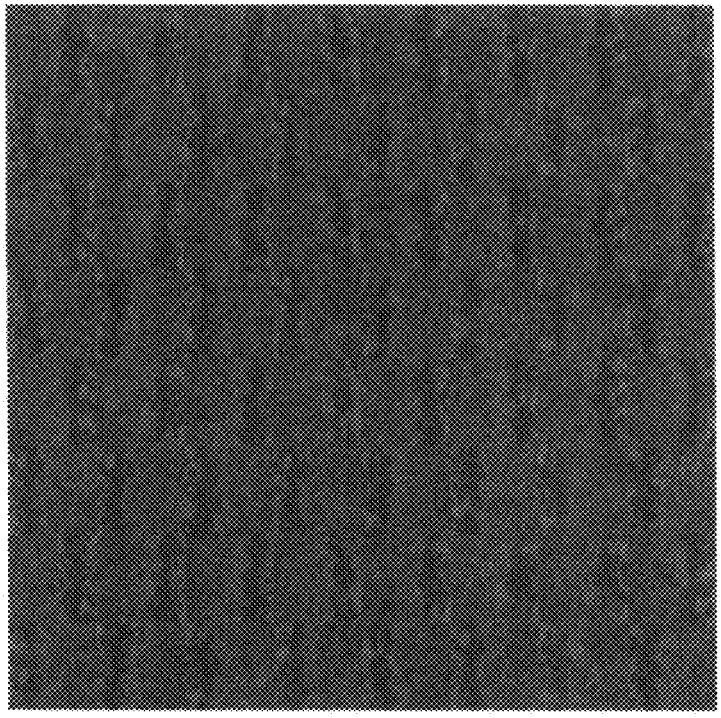
Figure 11:
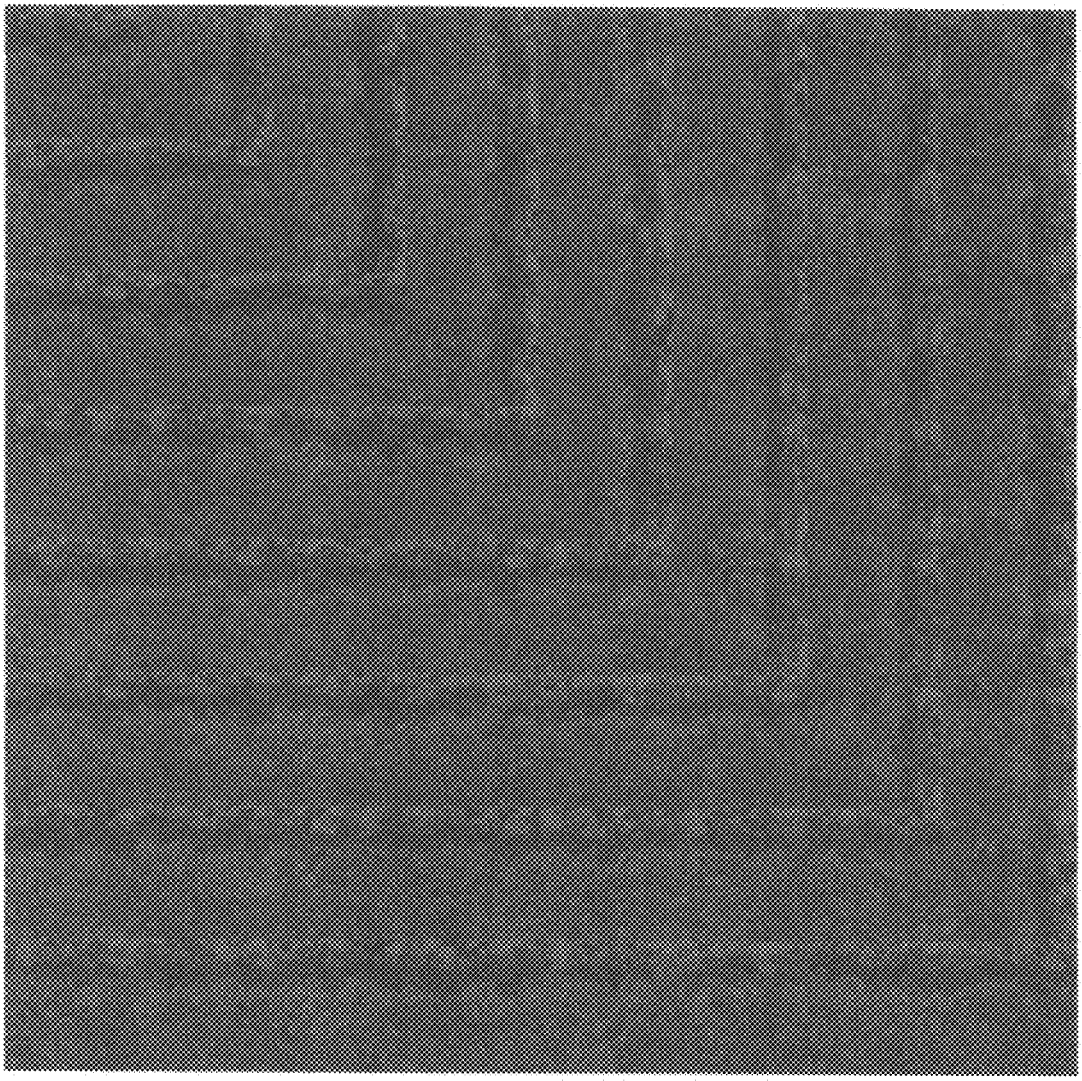

FIG. 6 has been marked with lines 10 identifying the individual, square tiles. Tile 12 displays a first uniform color or pattern 13, tile 16 displays a second, different uniform color or pattern 15, and tiles 14 display the first 13 and second 15 uniform colors or patterns and have a "fuzzy" edge 18 between the two 13 and 15. Tiles 14 have a "crisp" edge within color or pattern 15 at tile edge 17.

FIGS. 7-11 illustrate different assemblies of only tiles 14, each of which tile 14 has a "fuzzy" edge or boundary 18. That a substantial number of borders or other patterns can be produced as illustrated in FIGS. 7-11 with only one pattern of tile 14 vividly demonstrates the versatility of tiles manufactured in accordance with this invention and the endless number of possible embodiments of this invention.

Figure 12:
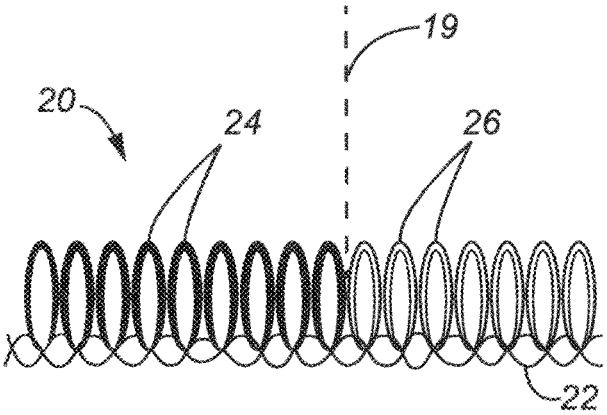
FIG. 12 is a schematic elevation view of tufted fabric having a "crisp" color transition.

"Crisp" edges or clear (abrupt) transitions in appearance may be produced by inserting yarn of a first color to produce relatively equally projecting yarns of that color on one side of a "boundary line" 19 and inserting yarn of a second color to produce relatively equally projecting yarns of that second color on the other side of the "boundary line" 19, as shown in FIG. 12. This will produce a clear, crisp transition from one color to another.

Such clear transitions can likewise be produced by abruptly changing other visible yarn or pile characteristics, including pile height, yarn texture, yarn type or any other discernible differences in yarn or pile such as transition between loop pile and cut pile.

FIG. 12 is a schematic elevation view of a tufted fabric 20 comprising a primary backing 22 and yarns of a first color 24 and of a second color 26. Substantially equal-height yarns 24 are side by side and, moving left to right along the drawing, are abruptly replaced at boundary line 19 by substantially equal-height yarns 26 of a second color. If the yarns behind those depicted in FIG. 12 are the same height and color of those schematically depicted in FIG. 12, then the fabric 20, when seen from above, will exhibit a very clear, "crisp" color transition.

Figure 13:
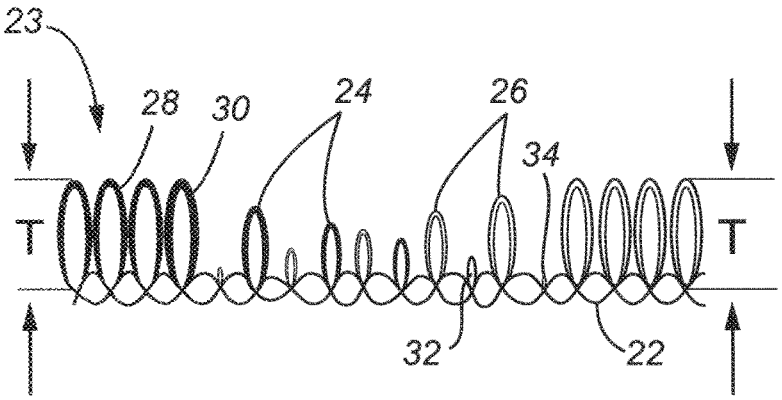
FIG. 13 is a schematic elevation view of tufted fabric having a gradual or "fuzzy" color transition.

By contrast, in another embodiment of this invention, fabric 23, depicted in FIG. 13 and when viewed moving left to right, includes yarns of a first color 24 that are formed into tall loops 28 and 30 having a loop height "T." The loops of the first color 24 begin to alternate with loops of a second color 26. Where the first color loops 24 are height "T," the interspersed second color loops 26 are absent or very short. Progressing to the right, as the first color loops 24 become shorter, the second color loops 26 become taller until the second color loops 26 are height "T," and the first color loops 24 are very short or absent, as depicted for loops 32 and 34. Similar, but not necessarily identical, progressions of loop colors and heights can happen in the yarns behind and in front of those depicted schematically in FIG. 13, so that such "fuzzy" regions of transition can occur along the web or across the web. Yarns of a first color (or other characteristic) may progress from a maximum tuft height "T" to a minimum tuft height through a progression of any different number of tuft heights. For example, yarns of a first color (or other characteristic) may progress from a maximum tuft height "T" to a minimum tuft height through a progression of at least three different tuft heights. In other embodiments, yarns of a first color (or other characteristic) may progress from a maximum tuft height "T" to a minimum tuft height through a progression of at least five different tuft heights. Similarly, yarns of a second color (or other characteristic) may progress from a minimum tuft height to a maximum tuft height "T" through a progression of any different number of tuft heights, including at least three or at least five different tuft heights.

Moreover, similar progressions of loop yarn textures or other qualities or characteristics of the yarn loops can also transition across the face of a carpet tile of this invention to provide visibly discernible "fuzzy" transition regions.

Figure 14:
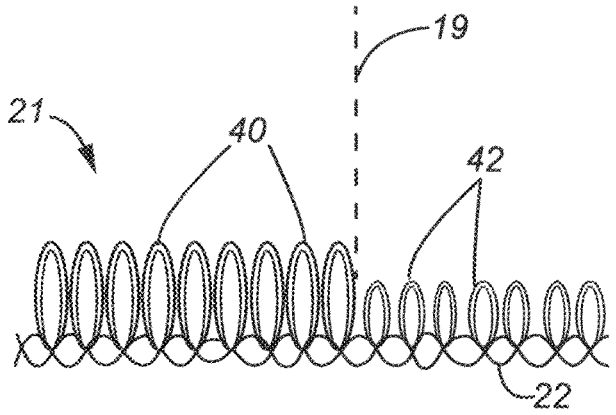
FIG. 14 is a schematic elevation view of tufted fabric having a "crisp" pile height transition.

FIG. 14 is a schematic elevation view of a tufted fabric 21 comprising a primary backing 22 and yarns of a first height 40 and of a second height 42. Yarns 40 and 42 may be identical in color, texture and composition, or they may be different in one or more ways in addition their differences in height. Substantially equal-height yarns 40 are side by side and, moving left to right across the drawing, are abruptly replaced at transition line 19 by substantially equal lower-height yarns 42. If the yarns behind those depicted in FIG. 14 are the same height and color of those schematically depicted in FIG. 14, then the fabric 21, when seen from above, will exhibit a very clear, "crisp" yarn height transition.

Figure 15:
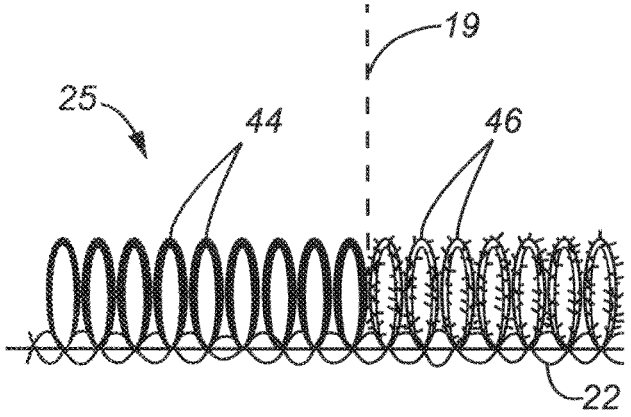
FIG. 15 is a schematic elevation view of tufted fabric having a "crisp" yarn texture transition.

FIG. 15 depicts a fabric 25 in which yarns tufts of a first texture 44 abruptly transition to yarn tufts of a second texture 46 at a transition line 19. If the yarns behind those depicted in FIG. 15 are the same height and color of those schematically depicted in FIG. 15, then the fabric 25, when seen from above, will exhibit a very clear, "crisp" yarn texture transition.

The Hall machine has the ability to move its needle bar laterally as much as the distance between several needles, together with the ability to control yarn feed individually so that a particular tuft can be formed of any height (up to a practical limit) down to "zero" (where there is no tuft present or the yarn is merely "tacked" to the primary backing). These characteristics (together with appropriate yarn thread-up) make it possible to place any of up to several colors, textures or other characteristics of yarn in a given location in the primary backing, and they make it possible to control individually the height (and therefore the visibility) of each yarn placed in the backing.

FIGS. 16-27 are illustrative of carpet tiles and tile assemblies possible in accordance with this invention.

Figure 16:
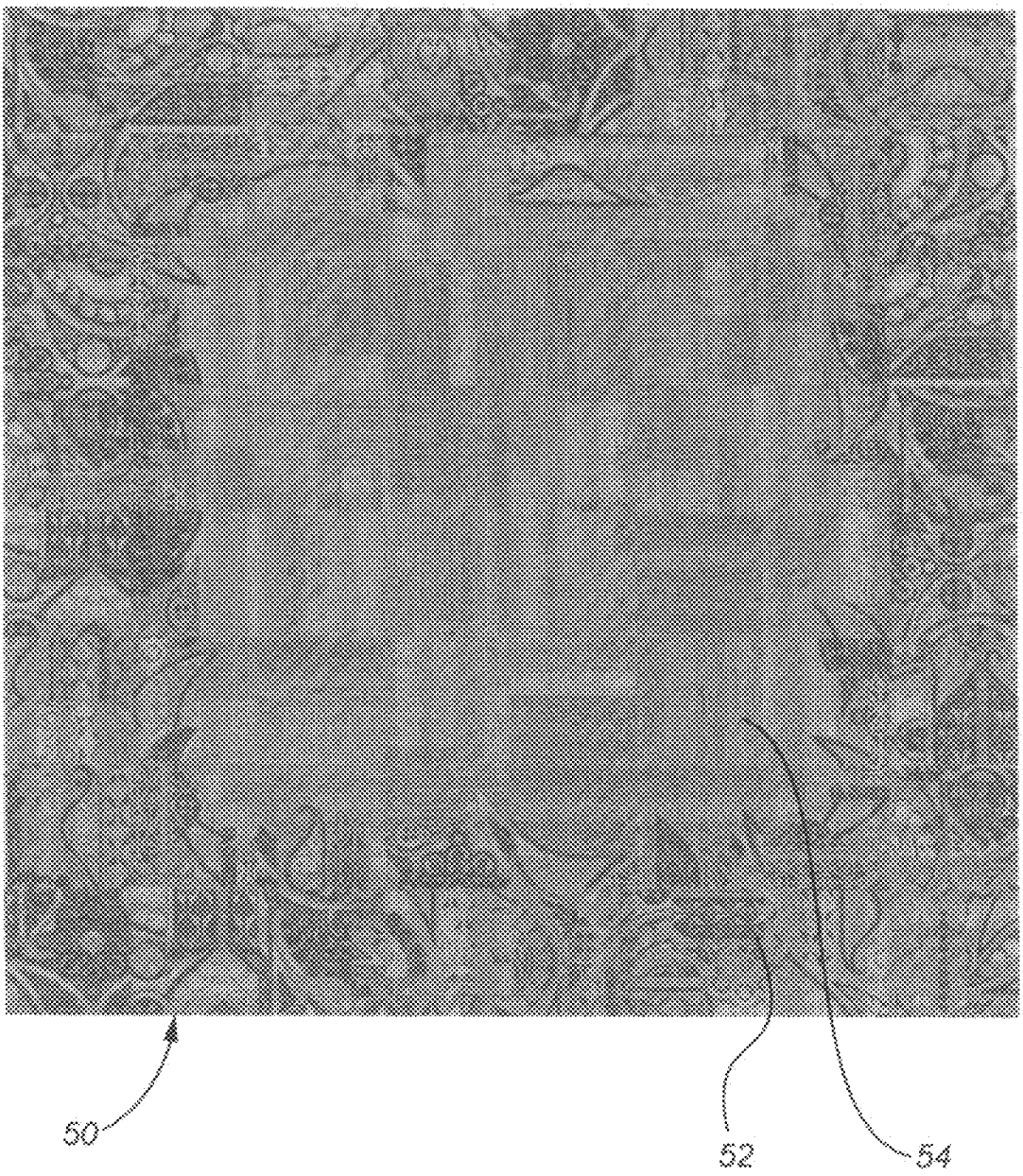
FIG. 16 is a simulated layout image of an assembly of this invention with visually complex images forming a border around an area of visually less complex images.

The first three of these simulations (FIGS. 16, 17 and 18) are square. FIG. 16 is a simulated layout image of an assembly 50 of this invention with visually complex, prominent images forming a border 52 around an area of visually less complex, less prominent images 54 that can be thought of as a "field." As used herein, and as exemplified in FIGS. 16-27:

"Visually complex" refers to patterns of shape, texture, color, tuft height or other properties on the face of a carpet tile or a portion of a carpet tile that are complex and unorganized looking.

"Visually less complex" refers to patterns of shape, texture, color, tuft height or other properties on the face of carpet tile or a portion of a carpet tile that are relatively indistinct and subdued, with shapes or other elements that are subtle and less easily seen or that are arranged in simple patterns like rows and columns of dots or other easily seen arrangements of simple shapes.

"Prominent" means images, shapes or other elements that are easy to see or otherwise perceive (by, for instance, touch).

"Not prominent" means images, shapes or other elements that are not easy to see or otherwise perceive.

Visually complex images are often also prominent, but need not necessarily be. Likewise, visually less complex images often are not particularly prominent, but they can be prominent. An example of visually less complex, but prominent images might be a rectilinear arrangement of bright red dots on a light color background. The Figures provide examples of visually complex, prominent images and visually less complex, less prominent images.

Figure 17:
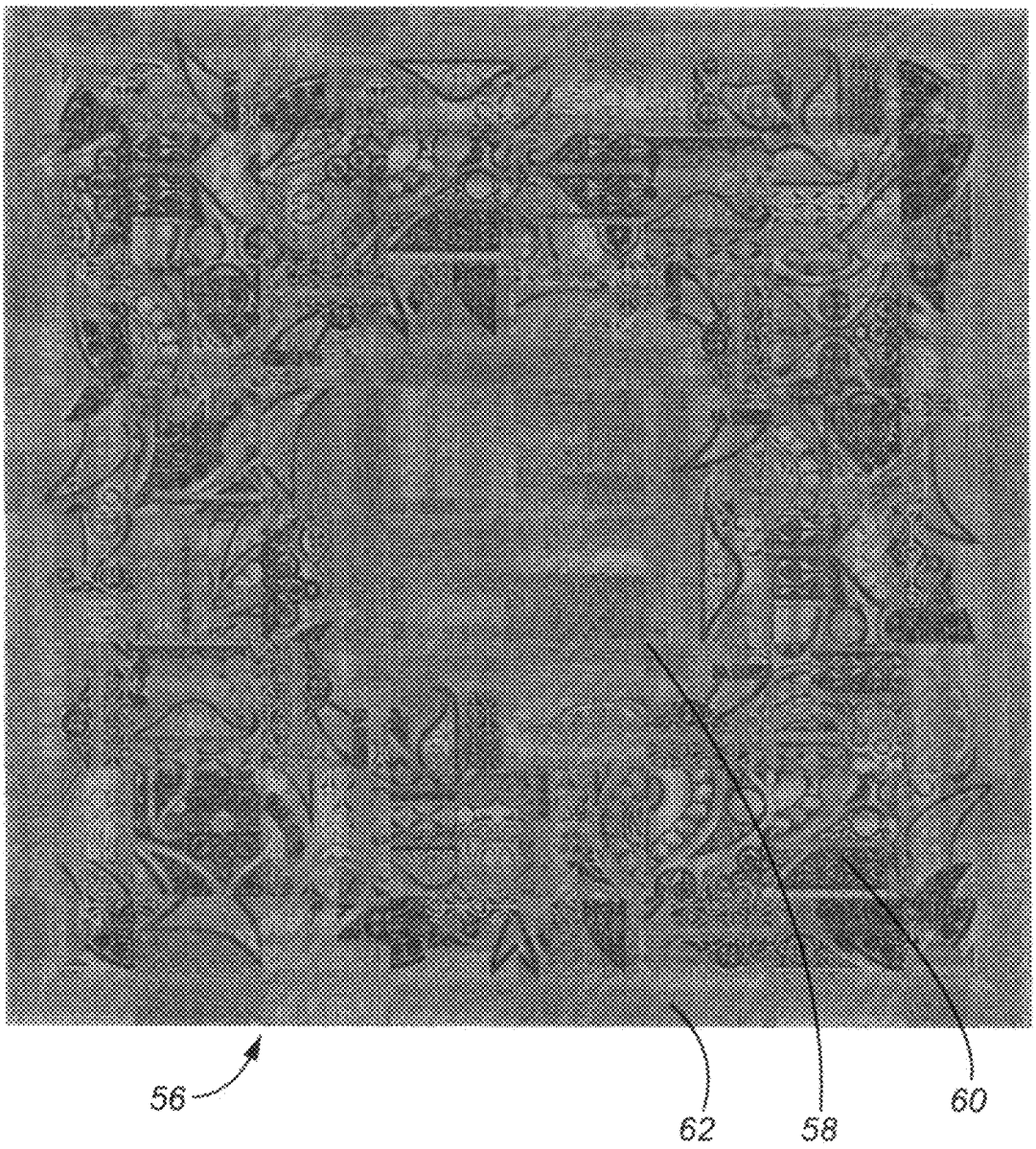
FIG. 17 is a simulated layout image of an assembly of this invention with a central area of visually less complex images surrounded by a wide boarder of visually more complex images that is itself surrounded by a narrow border area of visually less complex images.

FIG. 17 is another simulated layout image of an assembly 56 of this invention with a central area or field 58 of visually less complex images surrounded by a wide border 60 of visually more complex images that is itself surrounded by a narrow border area 62 of visually less complex images.

Figure 18:
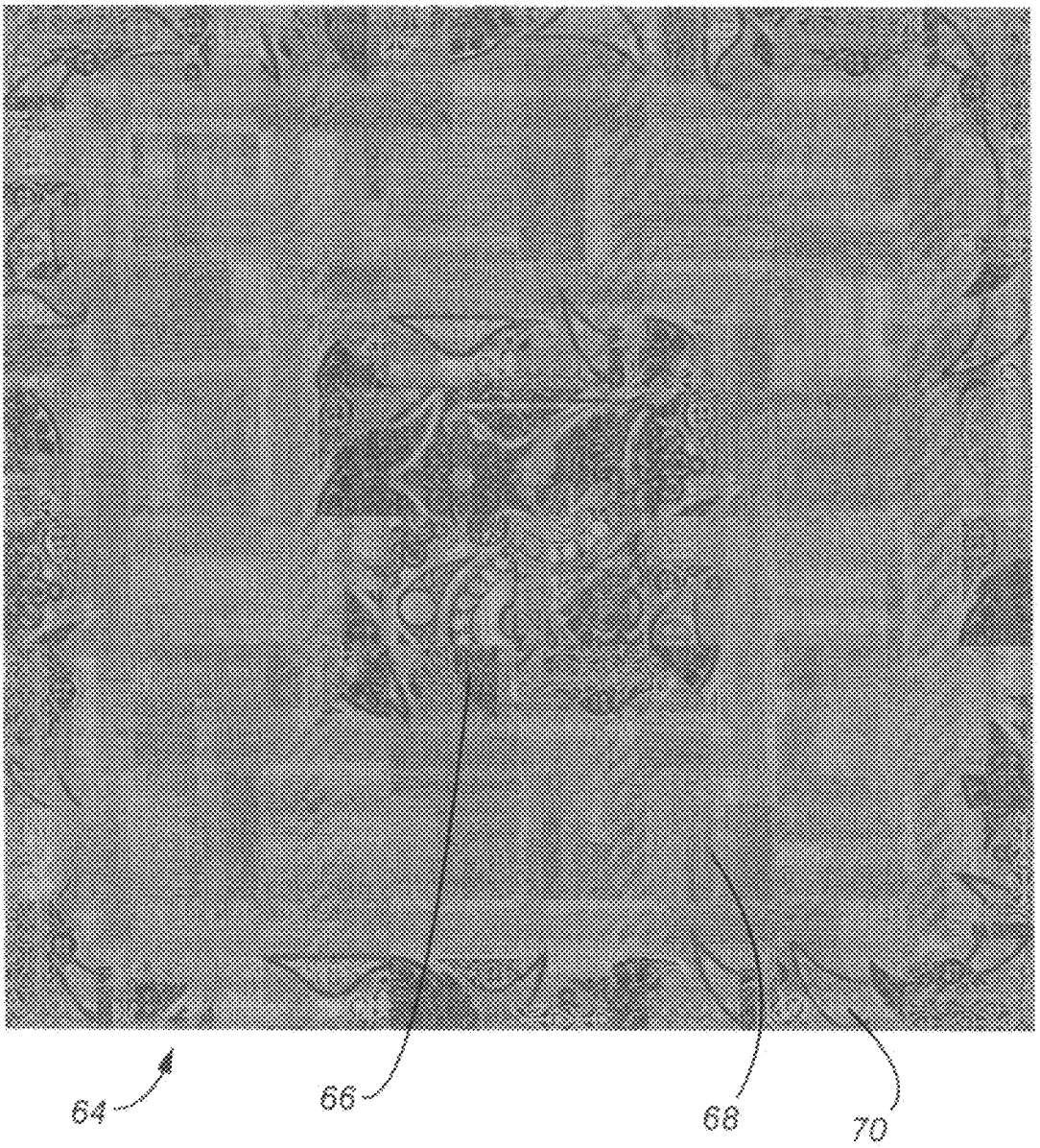
FIG. 18 is a simulated layout image of an assembly of this invention with a central area of visually more complex images surrounded by a boarder of visually less complex images that is itself surrounded by a narrow border area of visually more complex images.

FIG. 18 is yet another square simulated layout image of an assembly 64 of this invention with a central area 66 of visually more complex images surrounded by a border 68 of visually less complex images that is itself surrounded by a narrow border area 70 of visually more complex images.

Figure 19:
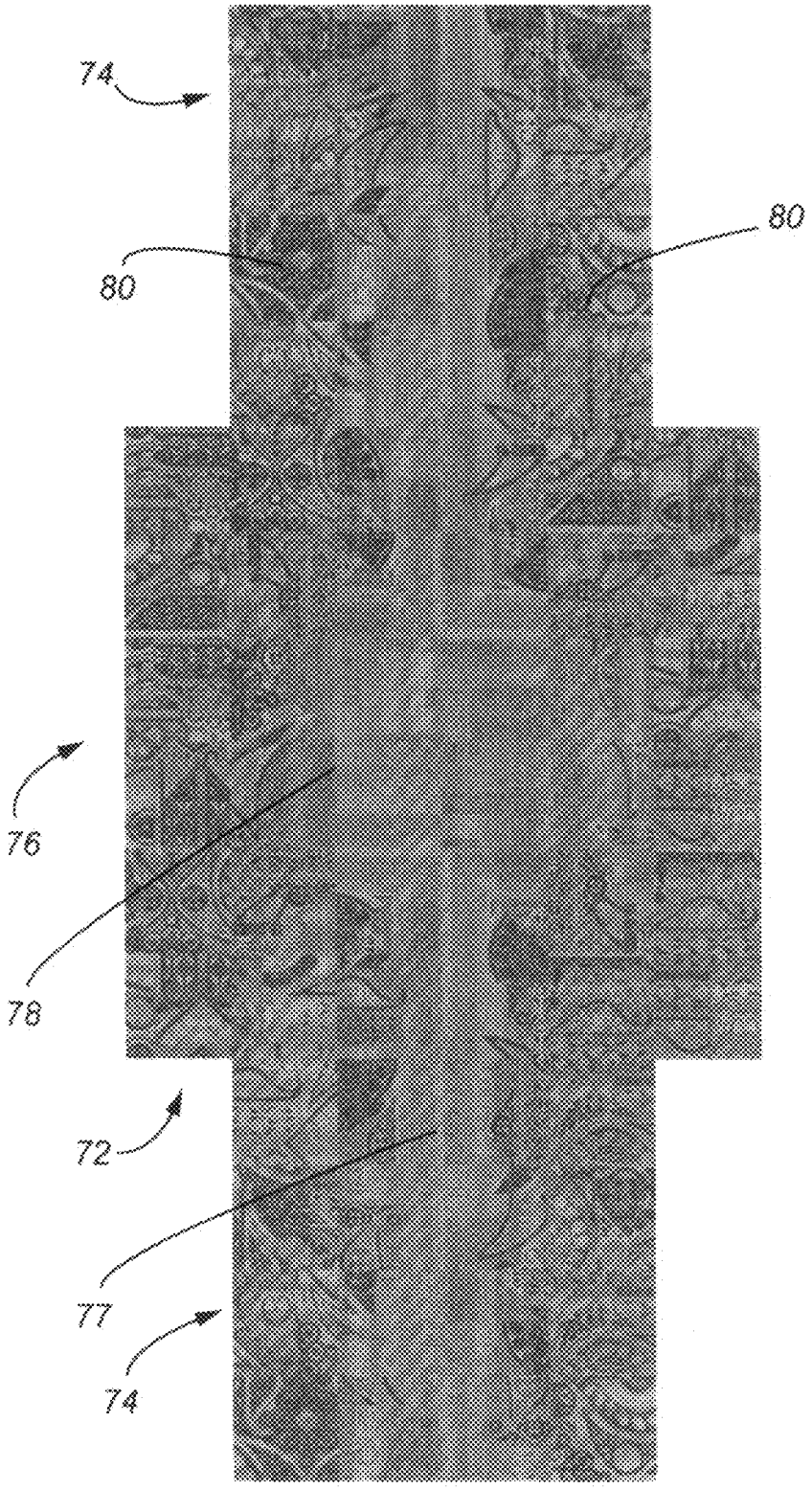
FIG. 19 is a simulated layout image of a cruciform assembly of this invent.

FIG. 19 is a simulated layout image of a cruciform assembly 72 of this invention (that might be used, for instance, in a hall) where an elongated portion 74 is bisected by a widened area 76. The elongated area 74 can utilize carpet tiles with visually less complex images in a central region or field 77 of the elongated area. The central region 78 can be wider in the widened area 76. A relatively wide border 80 on either side of the elongated area 74 is formed of visually more complex images tends to "define" the central corridor or field area 77 and 78.

Figure 20:
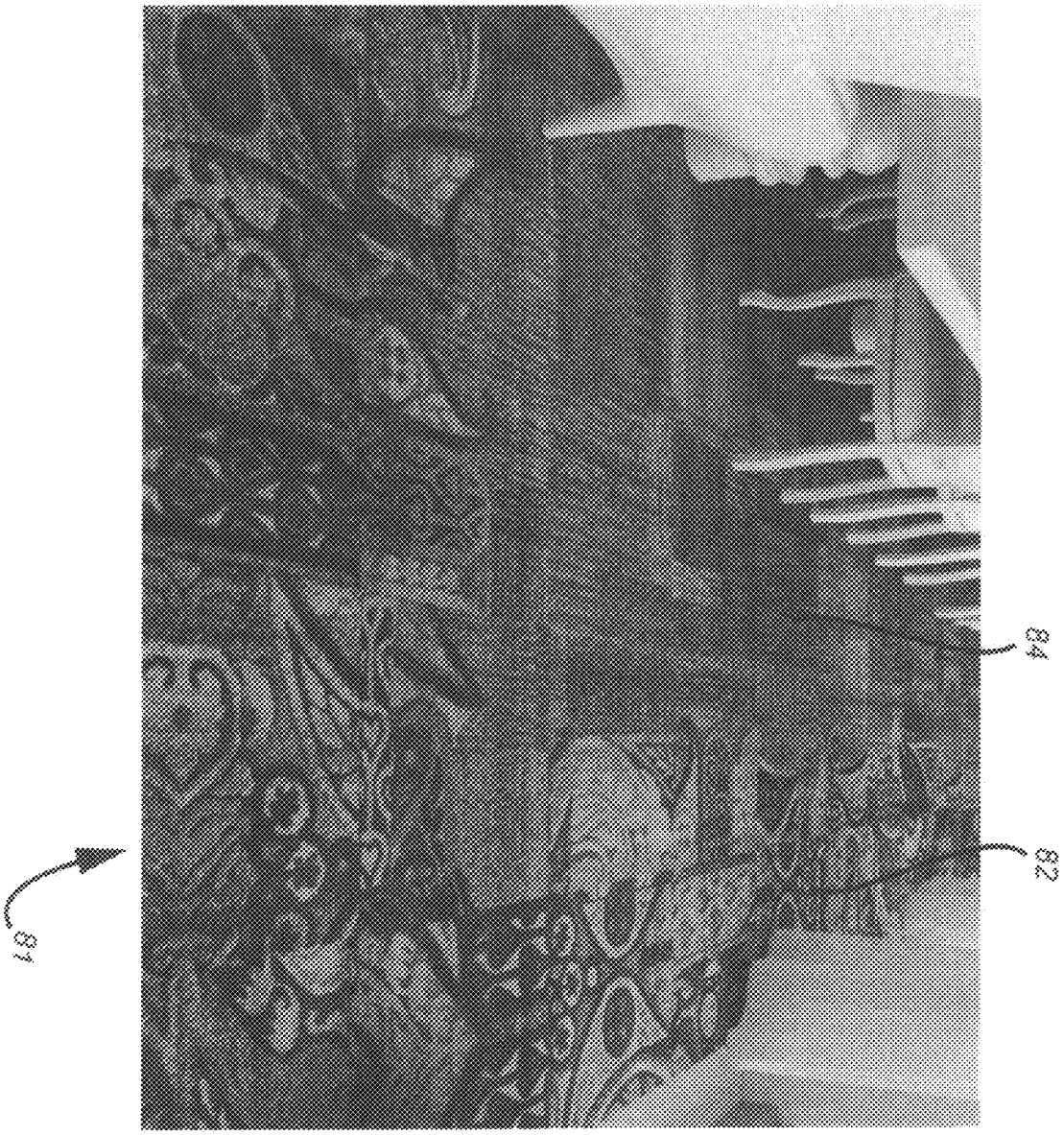
FIG. 20 is a simulated layout image of a banquet room with an assembly of this invention with visually complex images forming a border around an area of visually less complex images.

FIG. 20 is a simulated layout image of a banquet room with an assembly 81 of this invention with visually complex images forming a border 82 around an area of visually less complex images 84.

Figure 21:
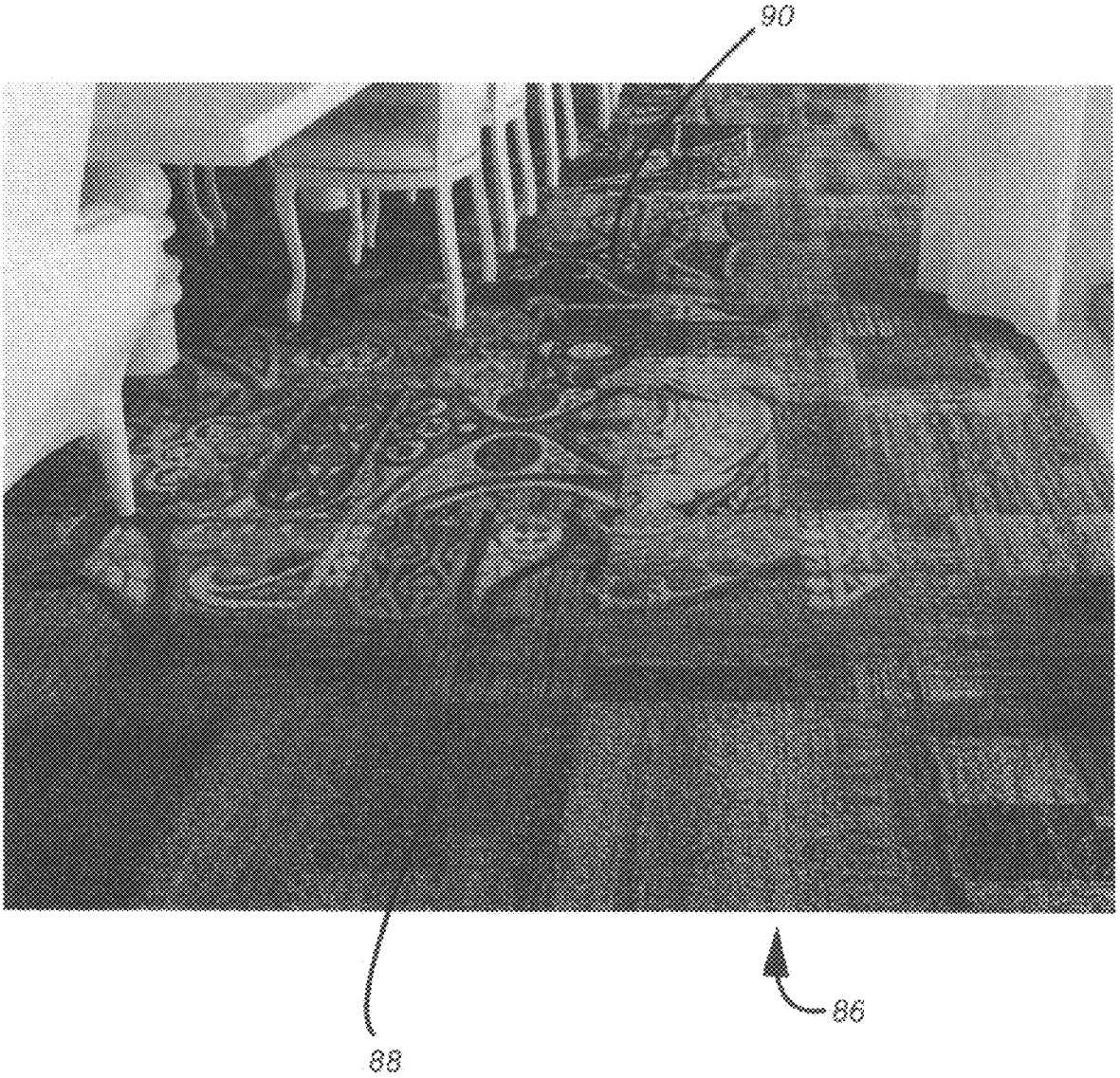
FIG. 21 is a simulated layout image of a banquet room with an assembly of this invention with visually less images forming a border around an area of visually more complex images.

FIG. 21 is a simulated layout image of a banquet room with an assembly 86 of this invention with visually less images forming a border 88 around an area of visually more complex images 90.

Figure 22:
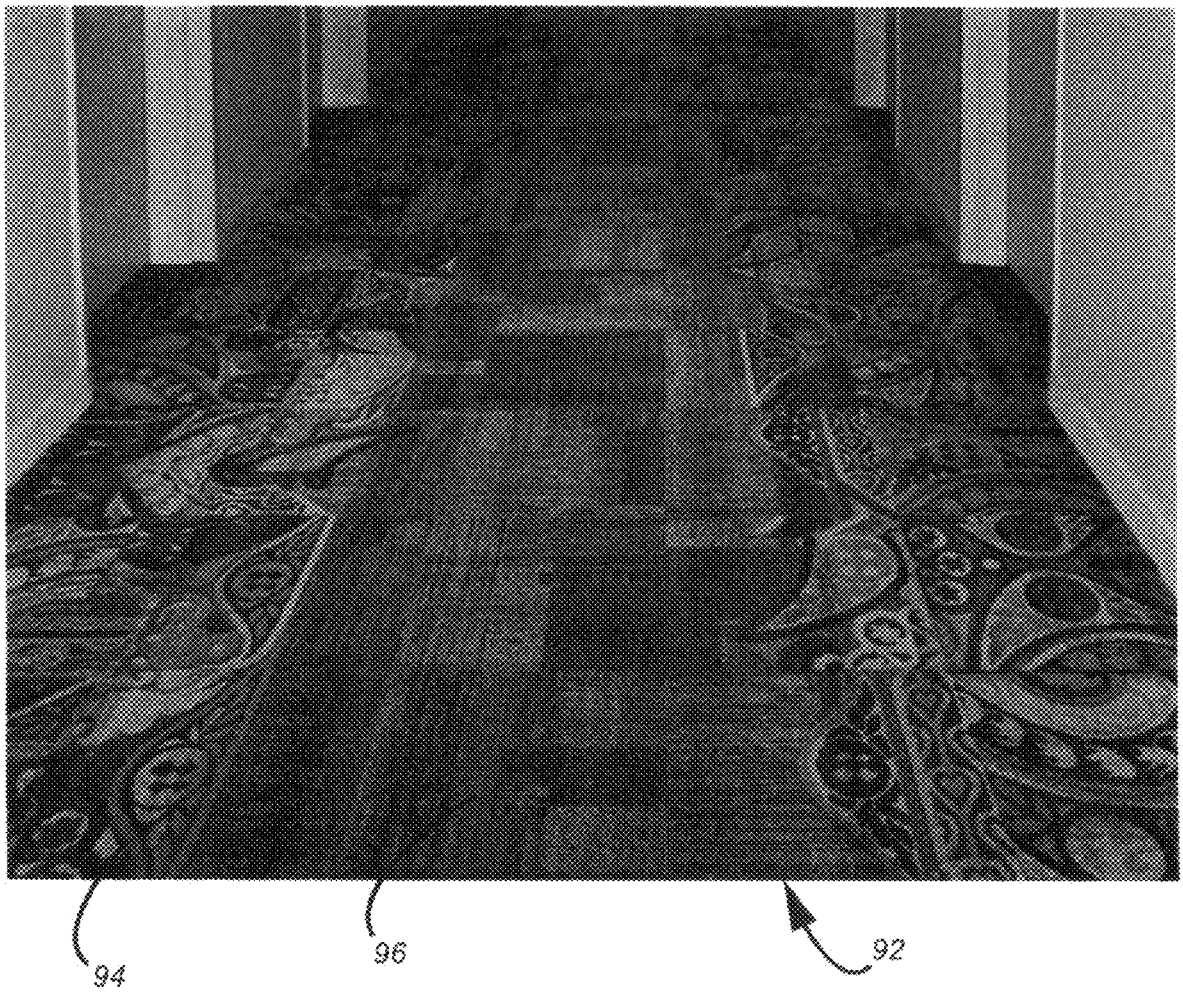
FIG. 22 is a simulated layout image of a hallway with an assembly of this invention with visually complex images forming a border along the hallway walls beside a central area of visually less complex images.

FIG. 22 is a simulated layout image of a hallway with an assembly 92 of this invention with visually complex images forming a border 94 along the hallway walls beside a central area of visually less complex images.

Figure 23:
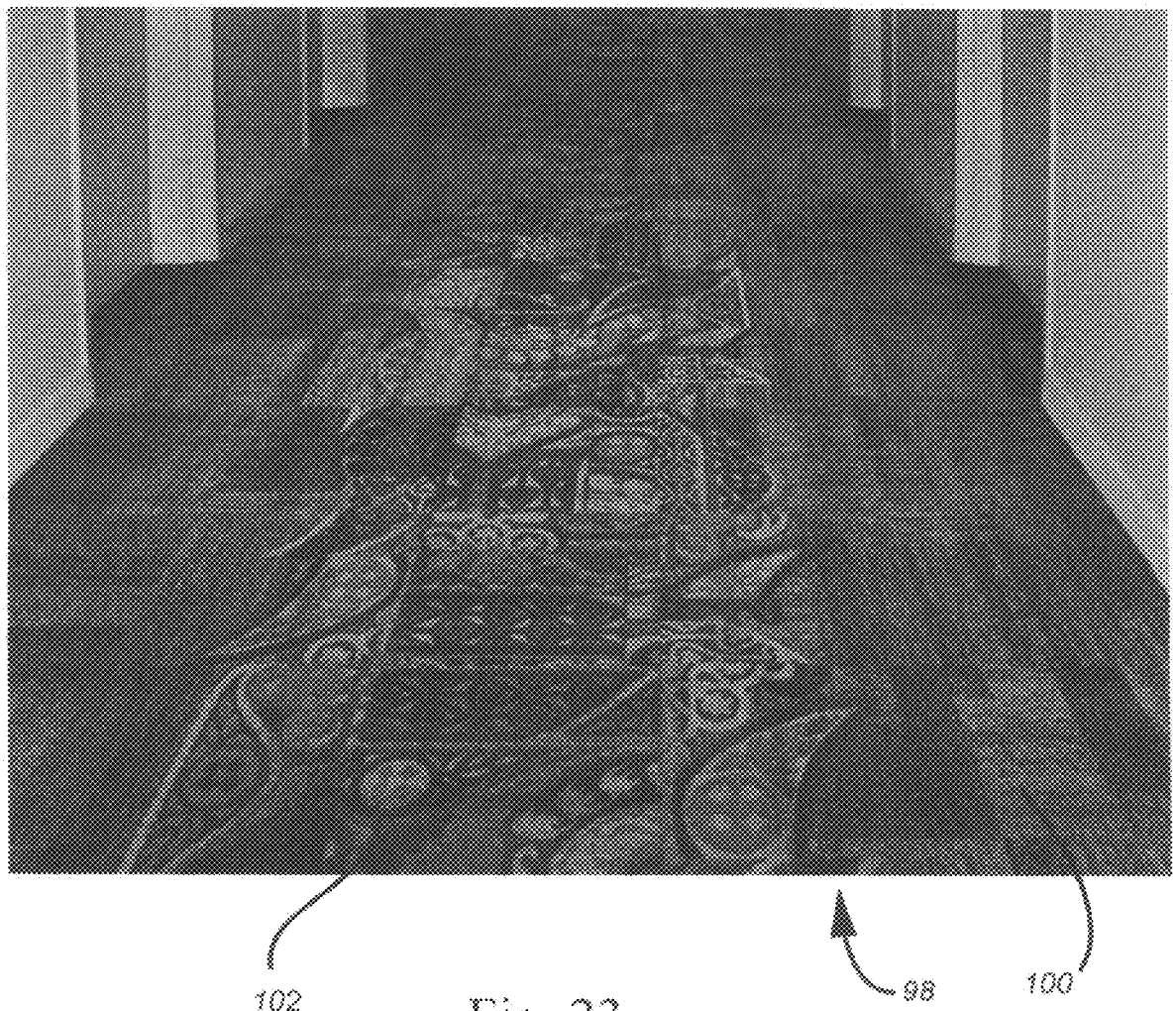
FIG. 23 is a simulated layout image of a hallway with an assembly of this invention with visually less complex images forming a border along the hallway walls beside a central area of visually more complex images.

FIG. 23 is a simulated layout image of a hallway with an assembly 98 of this invention with visually less complex images forming a border 100 along the hallway walls beside a central area of visually more complex images 102.

Figure 24:
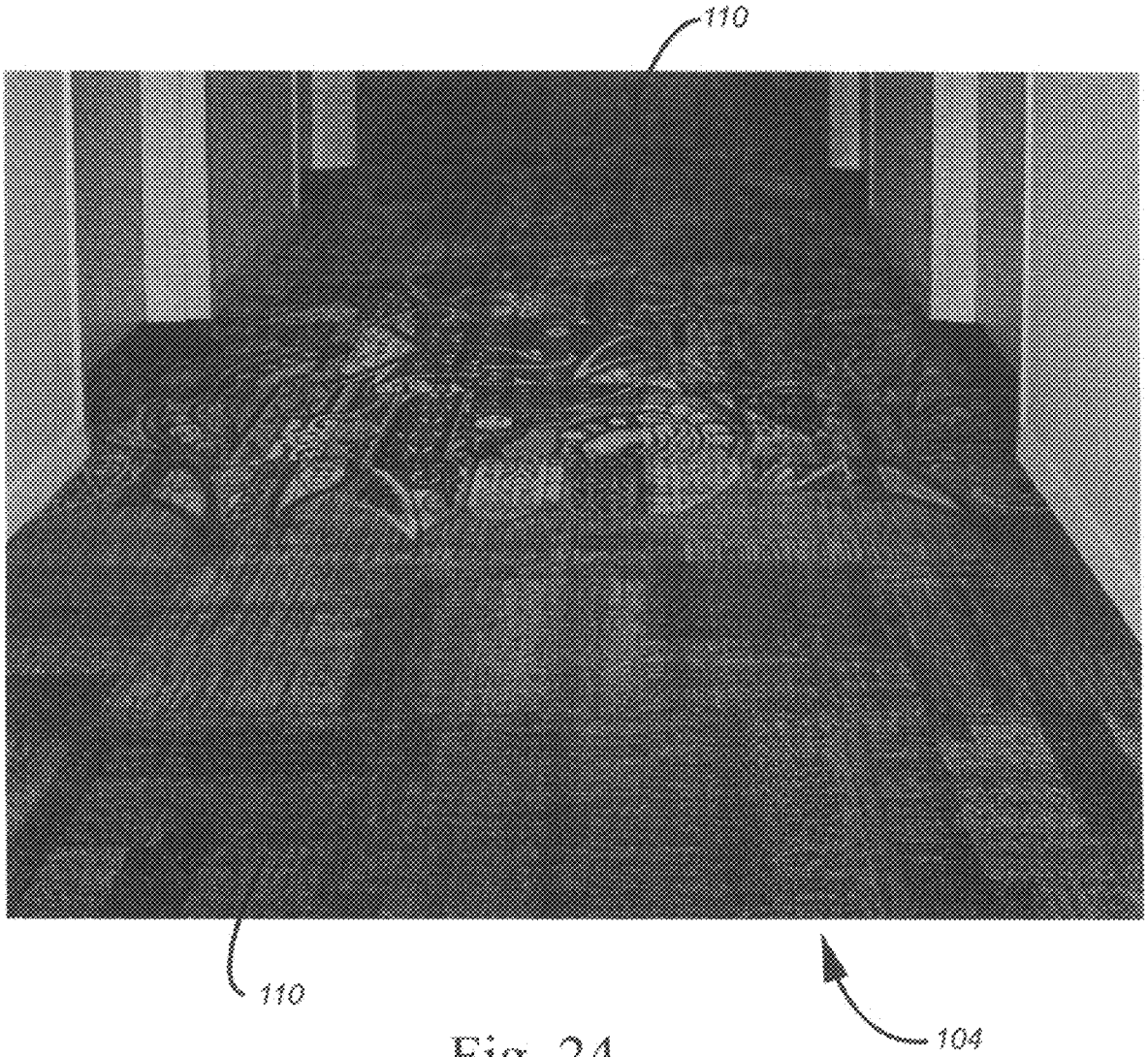
FIG. 24 is a simulated layout image of a hallway with an assembly of this invention with visually complex images in a longitudinally central portion of the hallway and with the remainder of the hallway floor covered with visually less complex images.

FIG. 24 is a simulated layout image of a hallway with an assembly 104 of this invention with visually complex images in a longitudinally central portion 106 of the hallway and with the remainder of the hallway floor 108 and 110 covered with visually less complex images.

Figure 25:
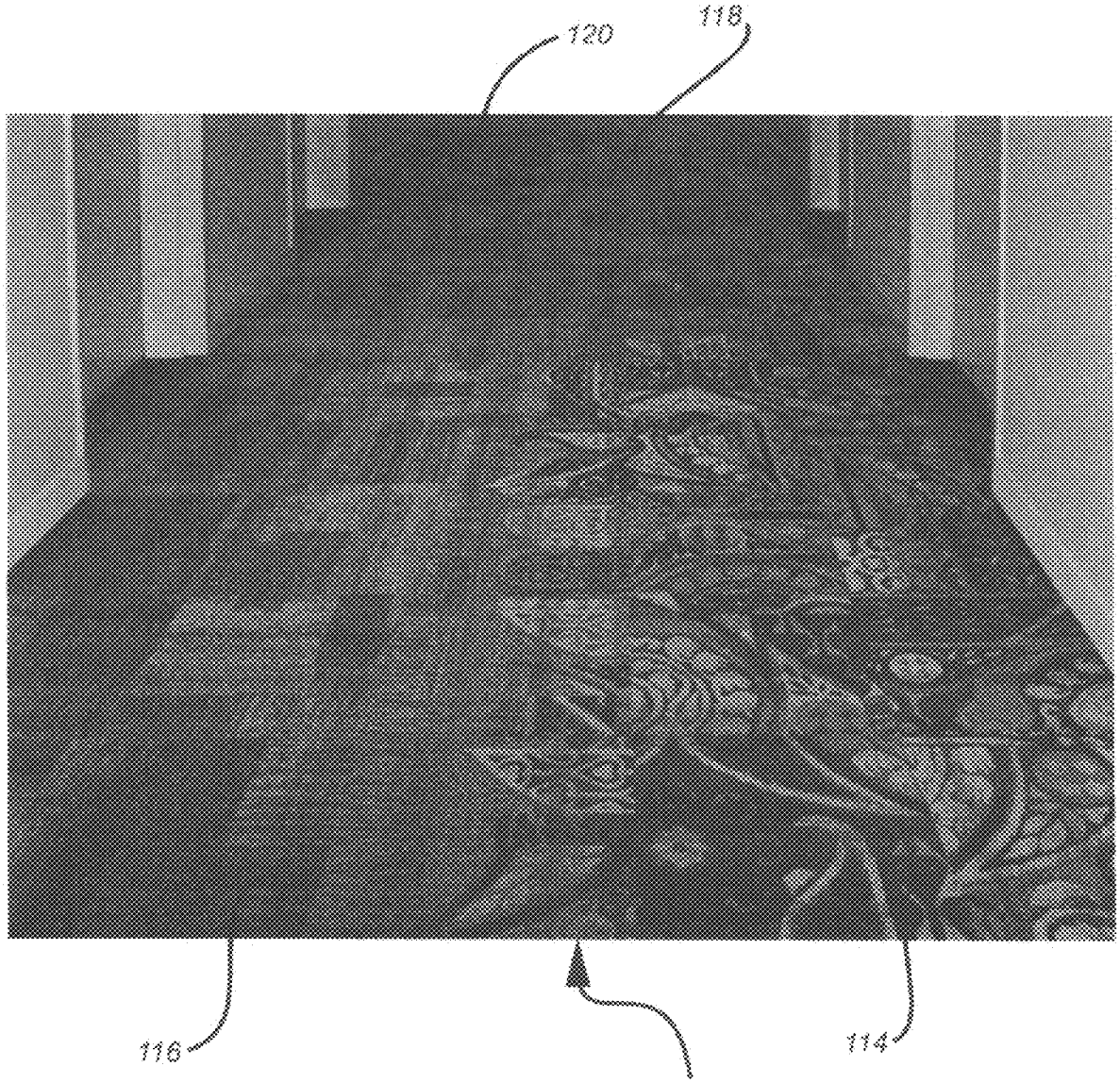
FIG. 25 is a simulated layout image of a hallway with an assembly of this invention with, along a first portion of the hallway, visually complex images on one side of the hallway and visually less complex images on the other side and, along a second portion of the hallway, reversed visually complex and visually less complex images.

FIG. 25 is a simulated layout image of a hallway with an assembly of this invention with, along a first portion of the hallway, visually complex images 114 on one side of the hallway and visually less complex images 116 on the other side and, along a second portion of the hallway, reversed visually less complex images 118 and visually more complex images 120.

Figure 26:
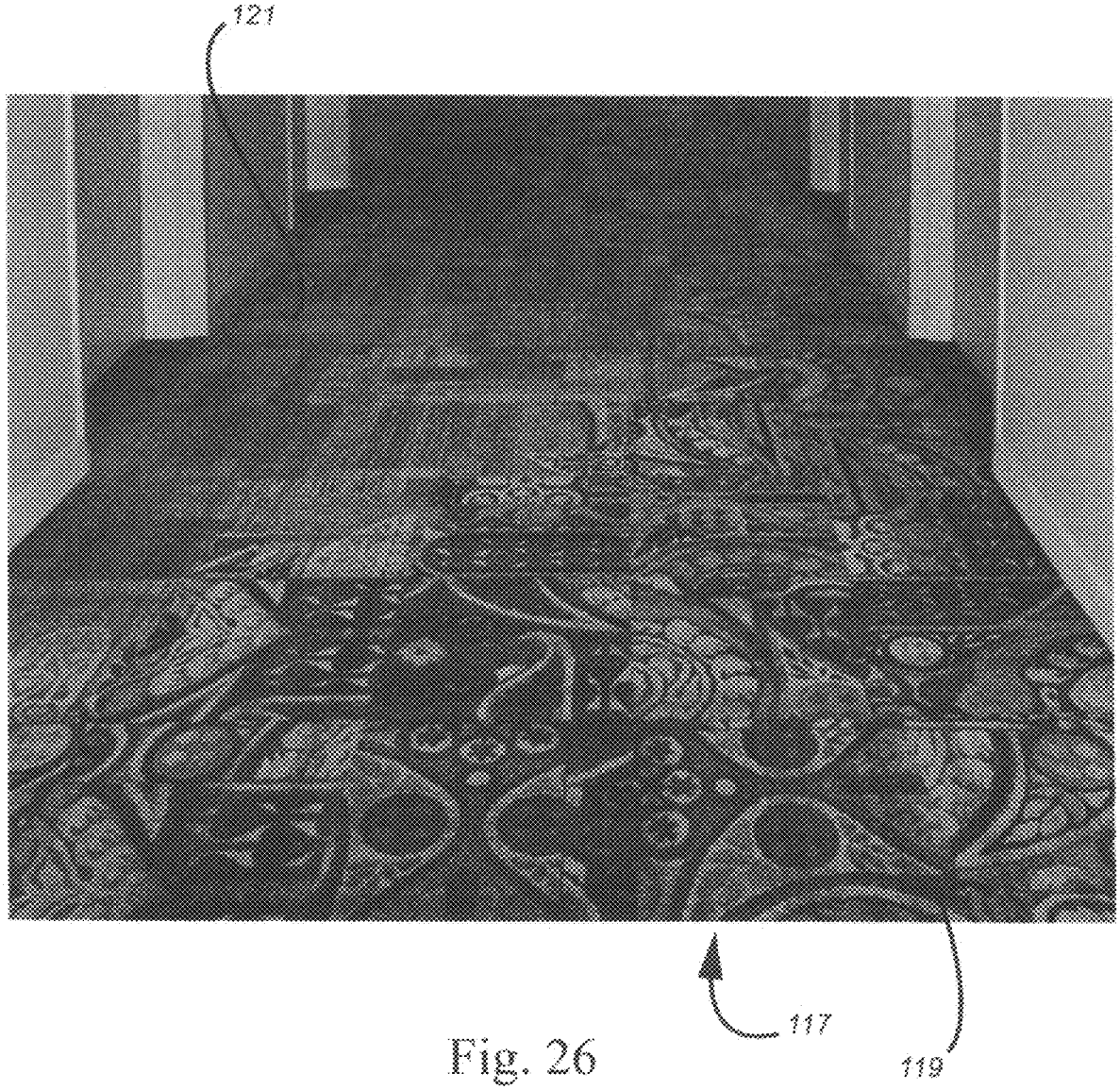
FIG. 26 is a simulated layout image of a hallway with an assembly of this invention with visually complex images filling the hallway floor except for a diagonal region of visually less complex images.

FIG. 26 is a simulated layout image of a hallway with an assembly 117 of this invention with visually complex images 119 filling the hallway floor except for a diagonal region of visually less complex images 121.

Figure 27:
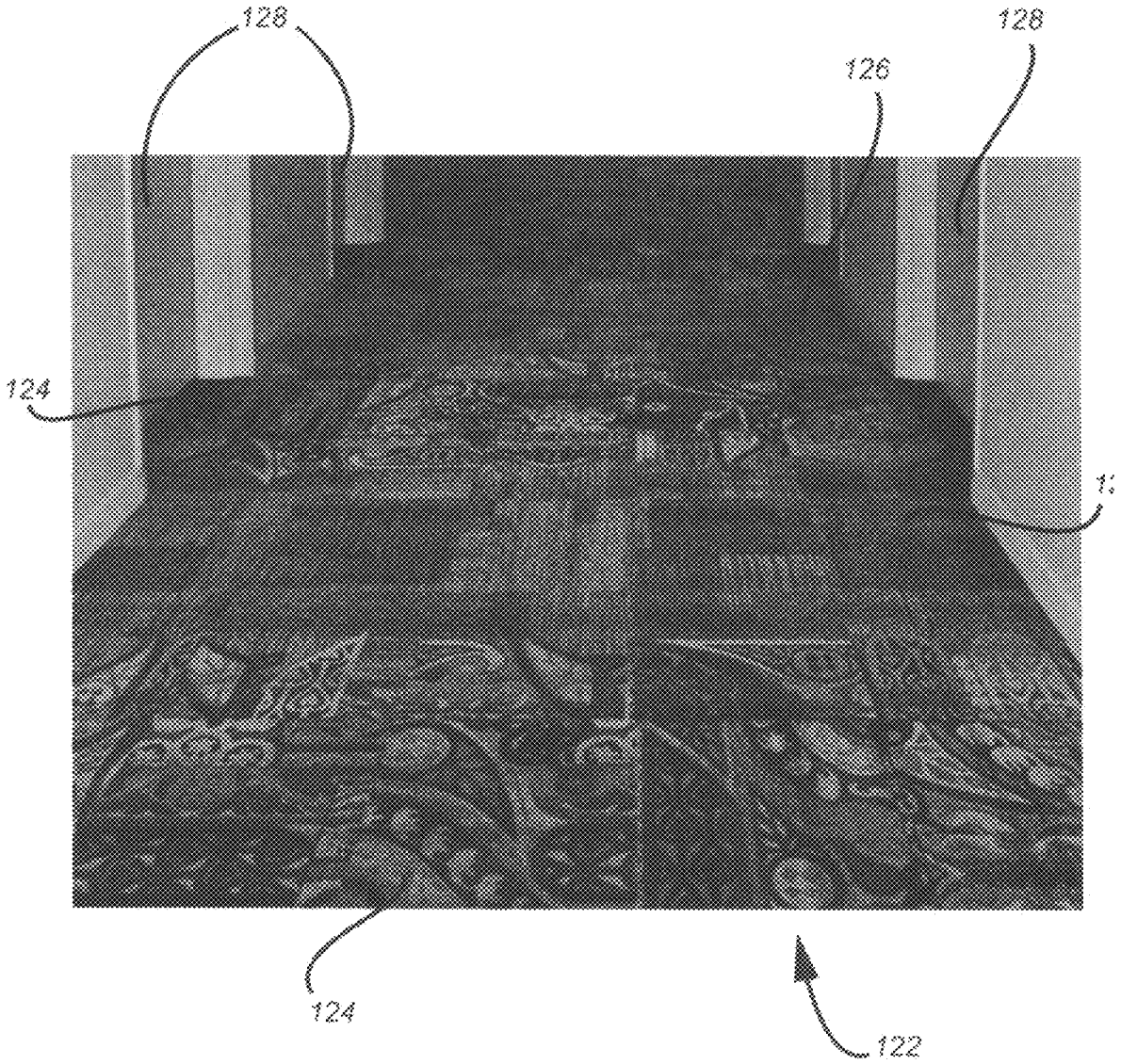
FIG. 27 is a simulated layout image of a hallway with an assembly of this invention with alternating regions of visually complex images and less complex images and with visually less complex images at the doorways.
Figure 28:
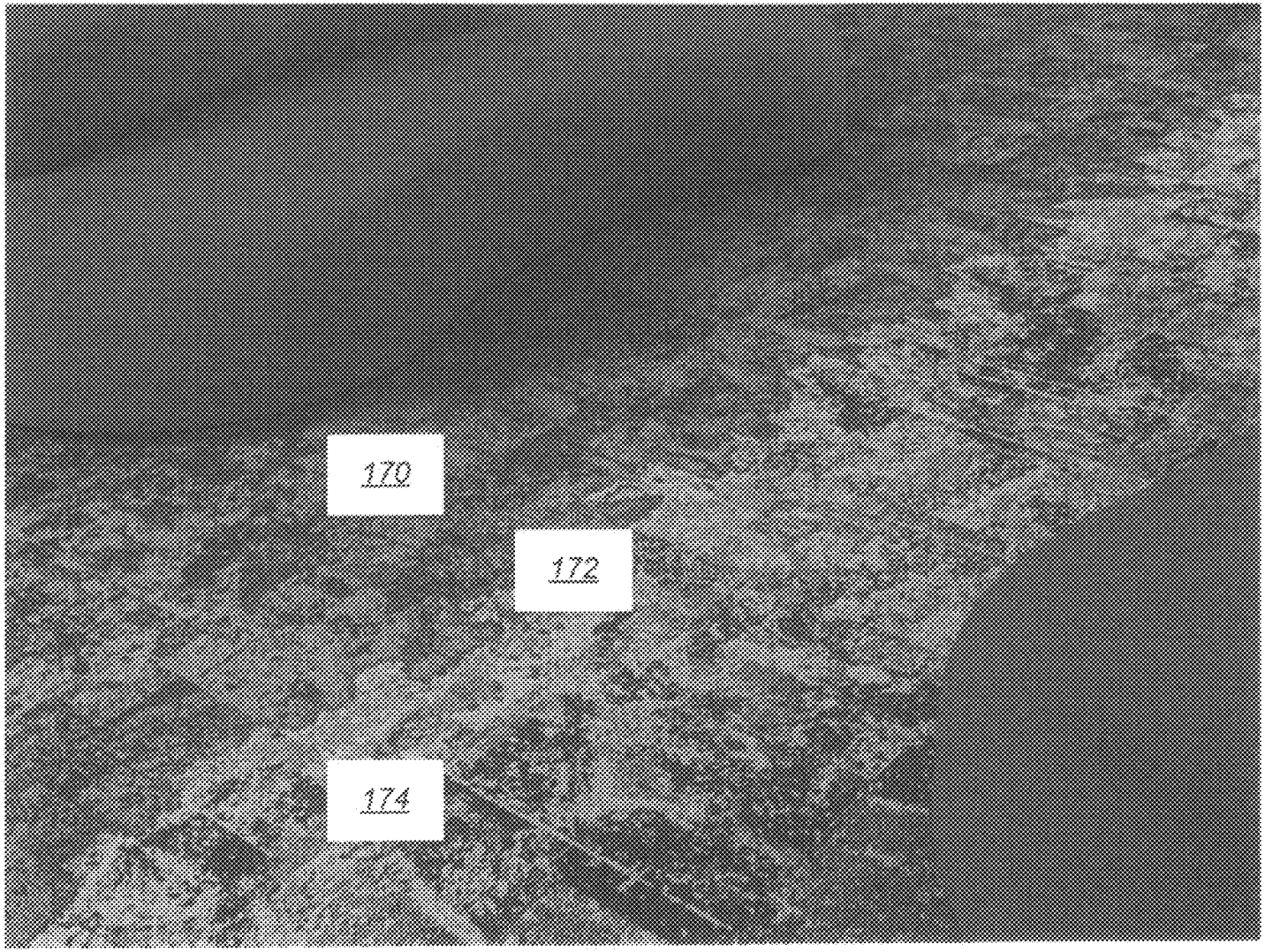
FIGS. 28-31 are simulated layout images of assemblies of additional embodiments of this invention.
Figure 29:
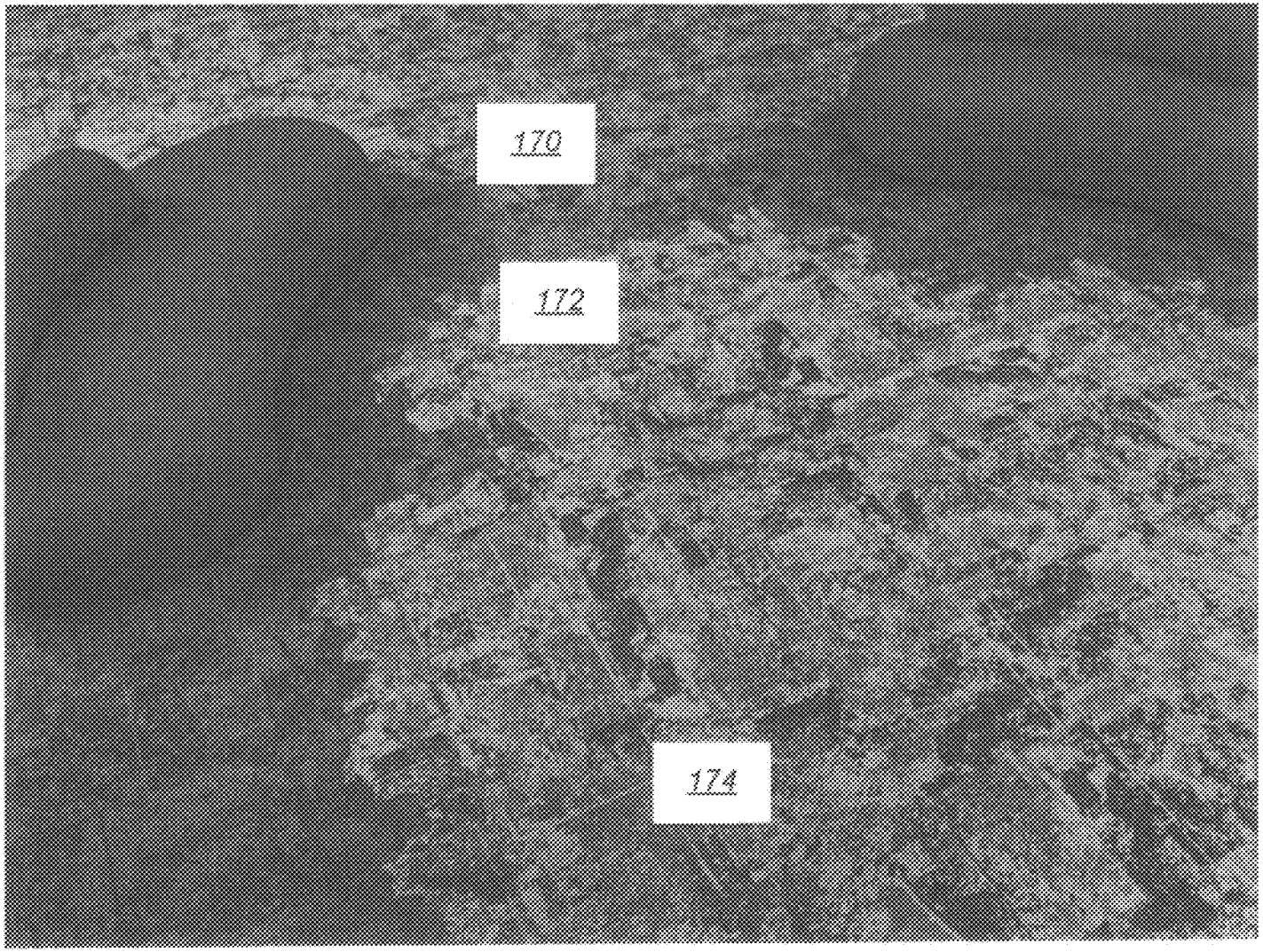
Figure 30:
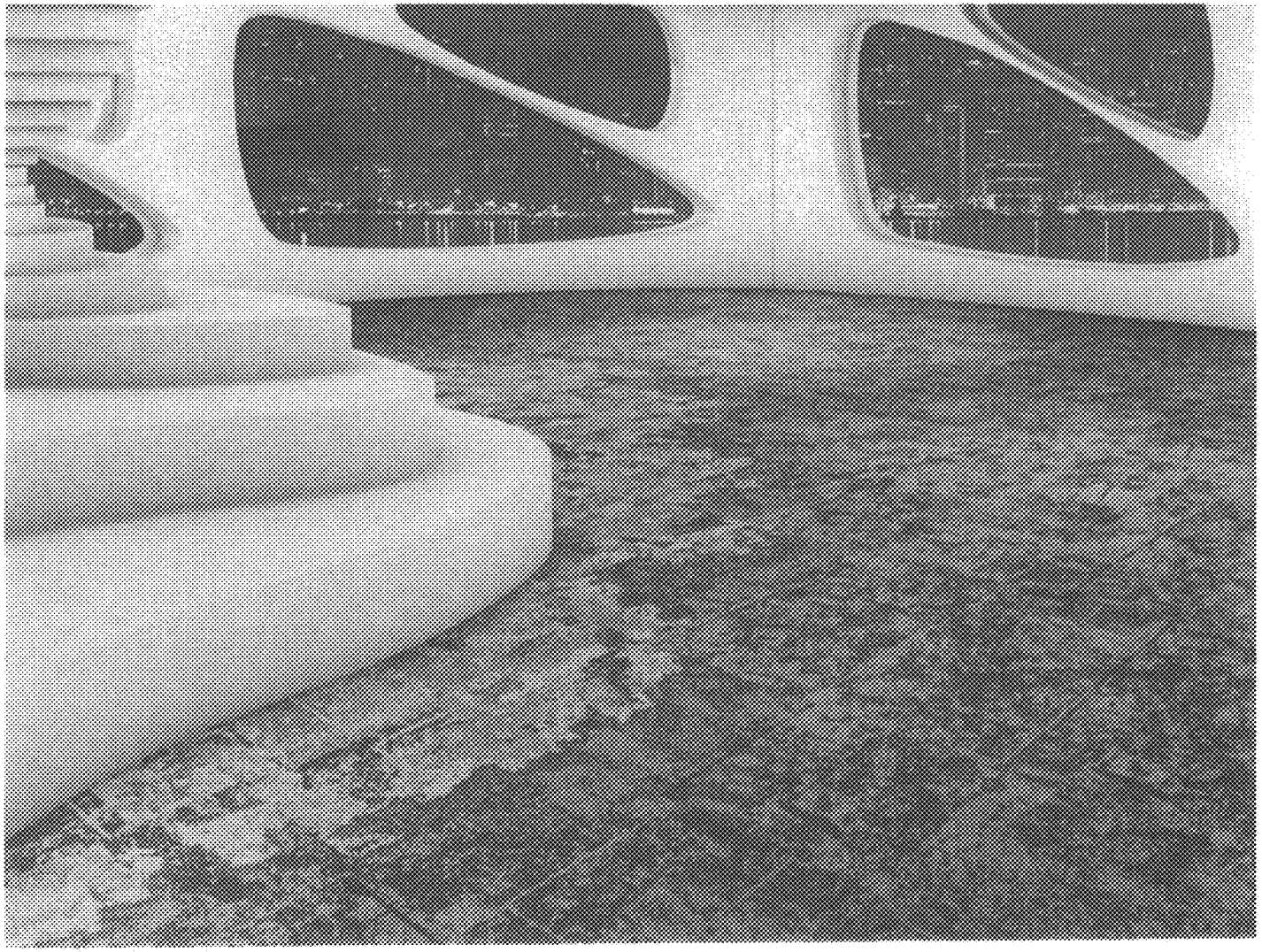

FIG. 27 is a simulated layout image of a hallway with an assembly 122 of this invention with alternating regions of visually complex images 124 and less complex images 126 and with visually less complex images 126 at the doorways 128.

The gradual or "fuzzy" color or other appearance transition is relatively narrow, it can be challenging to manufacture tiles with the transition falling precisely as desired at the tile edge. One alternative for addressing this manufacturing challenge is to make a considerably larger transition area as follows.

Figure 31:
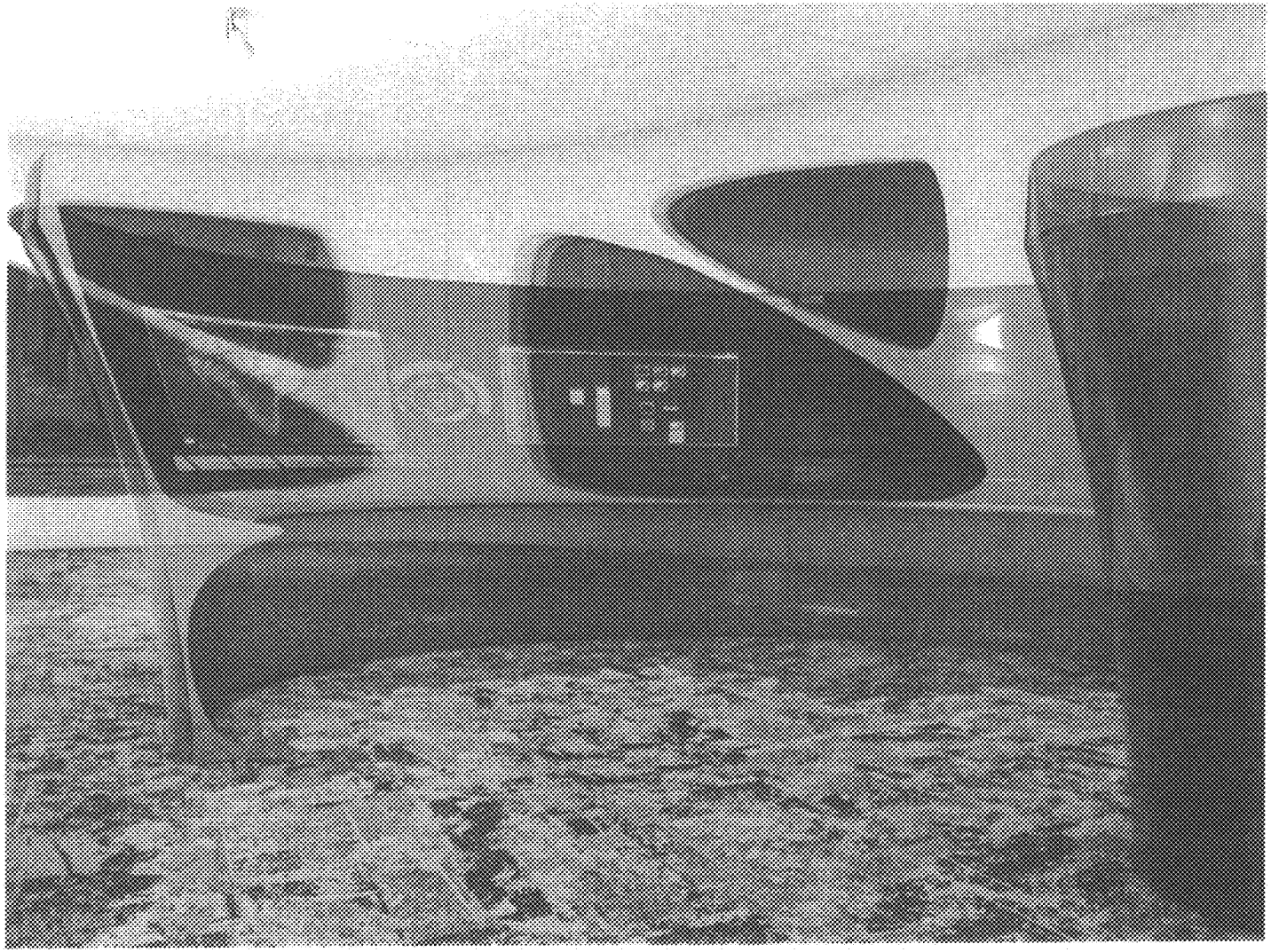
Figure 32:
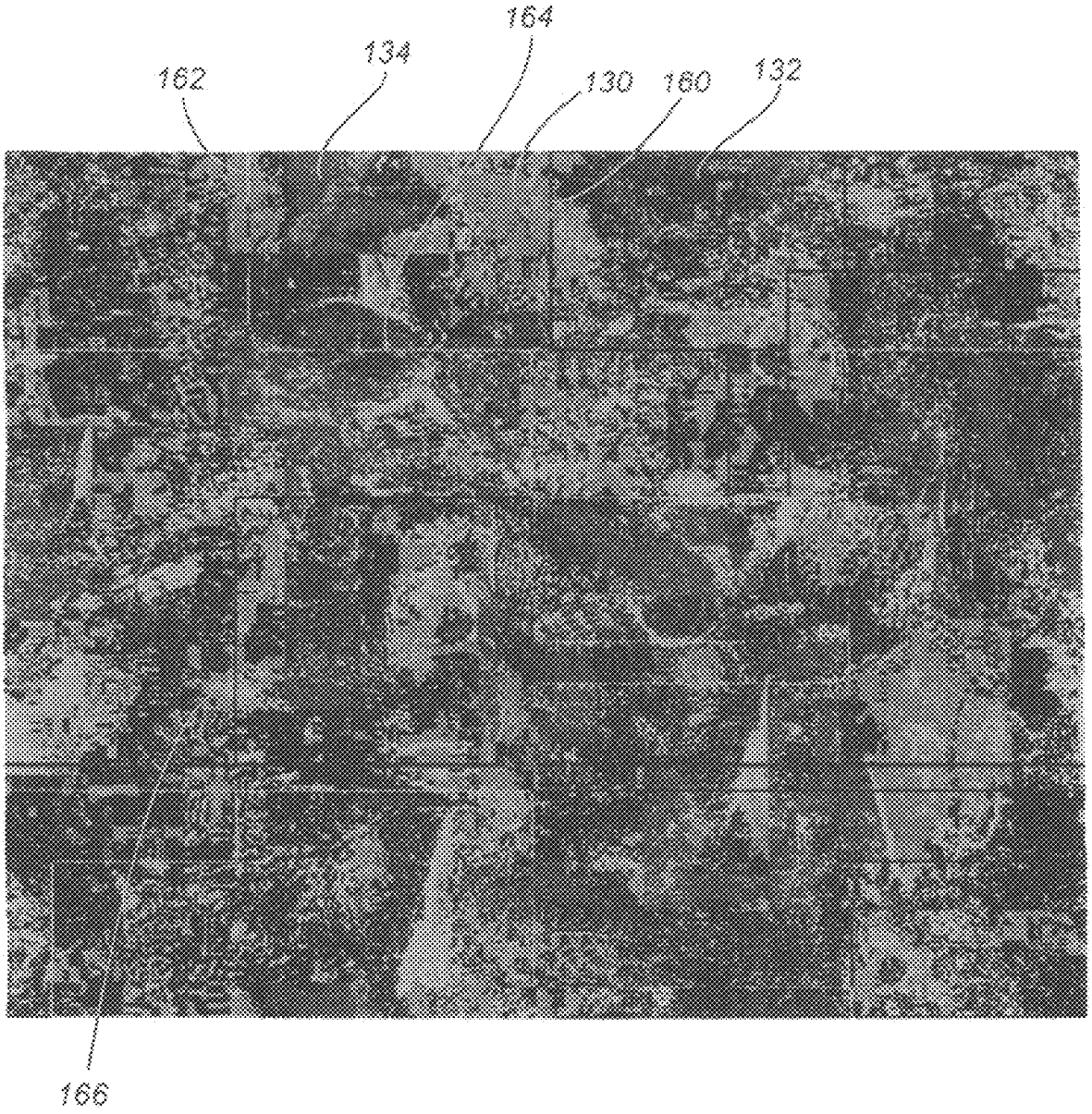
FIG. 32 is a first web design or pattern used in producing first tiles used in the assemblies depicted in FIGS. 28-31.
Figure 33:
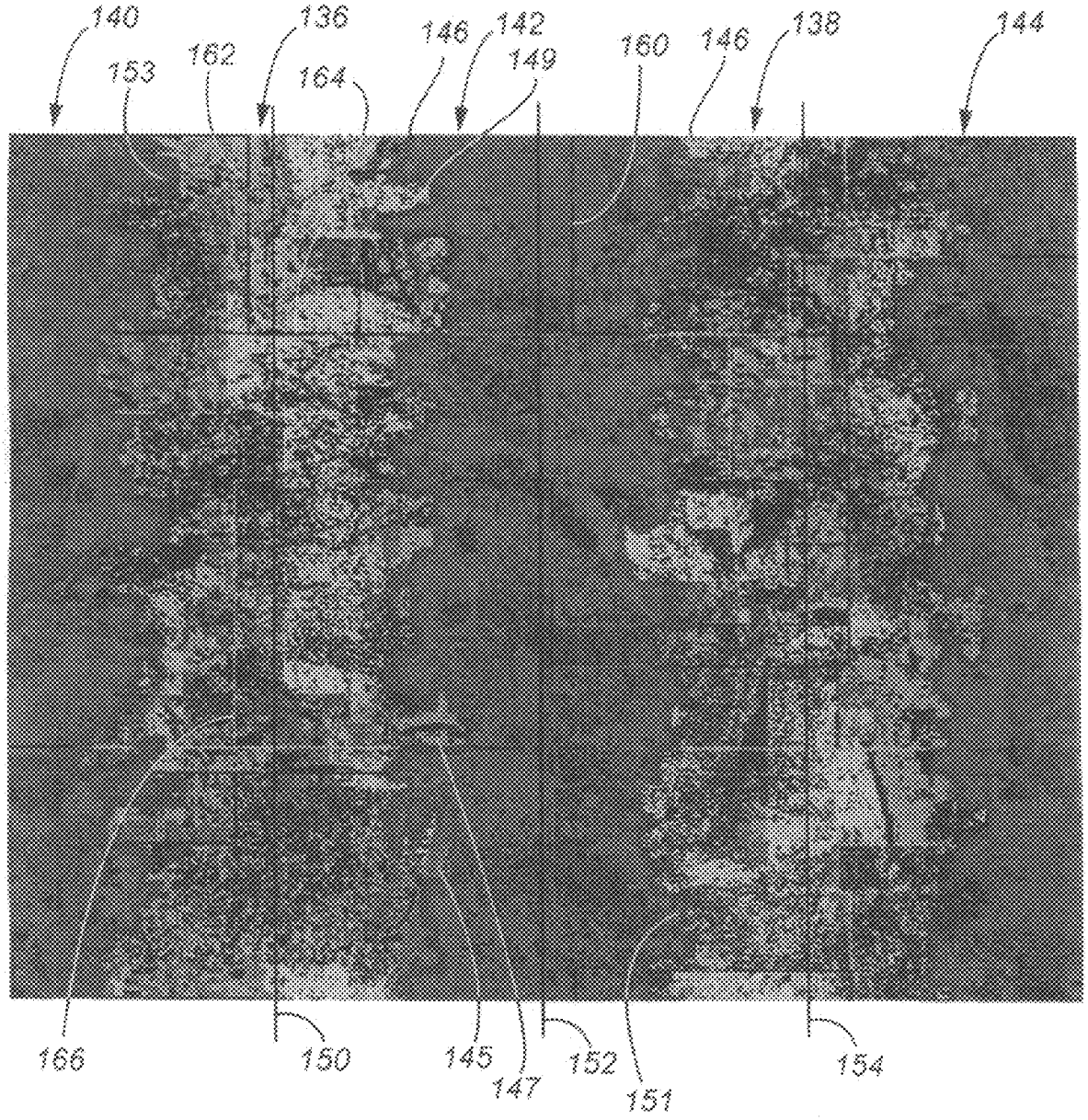
FIG. 33 is a second web design or pattern used in producing second tiles used in the assemblies depicted in FIGS. 28-31.
Figure 34:
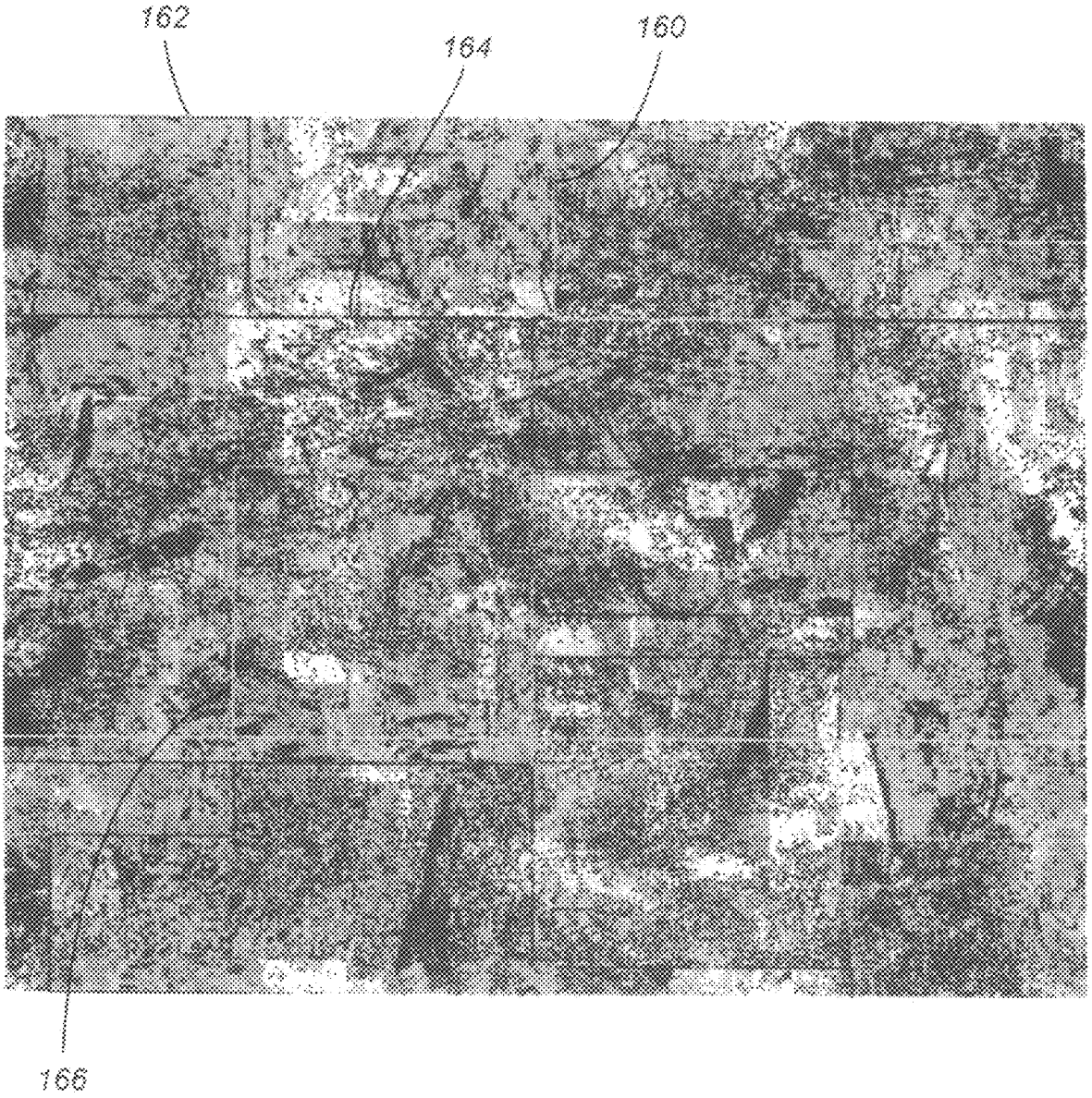
FIG. 34 is a third web design or pattern used in producing third tiles used in the assemblies depicted in FIGS. 28-31.

The embodiments of this invention depicted in FIGS. 28-31 may be assembled using tiles produced on carpet tile webs utilizing the web patterns shown in FIGS. 32-34. These web patterns can be used for various sizes of webs and tiles, but may typically be used for a web typically approximately two meters wide, so that four tiles 50 millimeters square can be cut from across a tile web made from this pattern. The pattern repeat is less than two meters so that successive cross-web cuts forming tiles from the web will fall at different places along the web, thereby producing tiles that contain different portions of the pattern along the web.

The web patterns of FIGS. 32-34 are similar in certain respects and dissimilar in others. Combined with other features of the tiles of this embodiment of this invention, the web patterns contribute to the production of tiles that generally can be installed facing in any direction without looking out of place and that do not look like tile assemblies because the junctions or seams between tiles are not visible in ways that make the assemblies look like tiles.

The FIGS. 32-34 patterns achieve these characteristics of appearance in three principal ways: (a) by production of tufted fabric on the Hall machine or another tufting machine that does not impart discernible pile nap or "lay," (b) by incorporating in the pattern "false seams," and (c) by using amorphous-looking, blotchy pattern elements.

The FIGS. 32-34 patterns incorporate somewhat randomly located "lines" parallel to tile edges lines 160, 162, 164 and 166. The "false seams" of lines 160, 162, 164 166 and others are created by different yarn colors, different pile height (either higher or lower pile) and with other visual differences. These lines look enough like tile to tile seams that actual seams that are visible simply look like part of the pattern, with the result that a viewer's attention is not drawn to the actual seams in a manner that makes it apparent that the installation is an assembly of modules rather than a more continuous carpet.

In the exemplary patterns of FIGS. 32, 33 and 34, the pattern of lines (including lines 160, 162, 164 and 166) are the same in all three patterns, but they could also be different.

The FIGS. 32, 33 and 34 patterns include sizable, but somewhat amorphous-looking, "patches" or "blobs," some of which are of solid color or yarn type and others of which are of at least two different colors of yarn or two different yarn visual characteristics of a type other than color. The differences can be differences of color and can be differences of pile height or any other visual differences.

The colors shown in the FIGS. 31, 32 and 33 patterns have to do with yarn placement and are not the actual yarn colors used and do not necessarily even correspond to different colors. By contrast, FIGS. 28, 29, 30 and 31 show exemplary actual colors in tiles made according to the FIGS. 31, 32 and 33 patterns. In the exemplary tiles depicted in FIGS. 28-31, each of the FIGS. 31 and 32 patterns are followed using three different yarn colors, and the FIG. 33 pattern is followed using two yarn colors.

FIGS. 31 and 32 may be rendered in three different yarns, typically different color yarns, with relatively large "blotches," e.g., blotch 130 of a solid one of the yarns used, or of two or three colors of yarn, like blotches 132 and 134. The appearance of the pattern of FIG. 32 is so irregular and amorphous that it is difficult to discern a pattern, which facilitates random installation and repositioning of tiles without any appearing to be out of place and helps to camouflage the flooring seams.

The pattern of FIG. 33 is quite similar to that of FIG. 32 and also may be rendered in three colors, but there are two longitudinally extending first regions 136 and 138 that extend along the web and contain yarn colors or other characteristics that contrast significantly and noticeably with three other second longitudinally extending regions 140, 142 and 144. While the separately identifiable longitudinally extending regions are clearly visible, demarcation 146 between adjacent regions is somewhat muted. Relatively large (wide and long), very irregular portions e.g., 145, 147 and 149 in each of the regions 136, 138, 140, 142, and 144 extend toward and interfit with similar irregular portions (e.g., 151, 153) in each adjacent region. By contrast with the fuzzy edge 18 described above relative to FIG. 6, the scale of the irregular portions (e.g., 145, 147, 149, 151, 153) is large enough to make the irregularities relatively easily visible from vantage points from which carpet is typically viewed.

As shown in FIG. 33, division of a carpet tile web with the pattern of FIG. 33 into four "columns" of equal-width tiles, along lines 150, 152 and 154 will cause a portion of one of the first longitudinally extending regions (e.g., 136) and a portion of one of the second longitudinally extending regions (e.g., 140) to be included on each tile cut from that web.

Each of the FIGS. 32 and 34 web patterns are closely similar to each other and are relatively uniform across the entire web, so there is no demarcation between regions. Moreover, the appearance of tiles cut from the FIG. 32 pattern may be closely similar to or essentially the same as the appearance of regions 140, 142 and 144 of the FIG. 33 pattern. As a result, all of the tiles cut from a web made according to the FIG. 32 pattern may look like regions 140, 142 and 144 of a web made according to the FIG. [32] *33* pattern. Similarly, all of the tiles cut from a web made according to the FIG. 34 pattern may look like the regions 136 and 138 of the FIG. 33 web pattern.

FIGS. 28-31 depict the appearance of carpet tile installations utilizing the three types of tiles 170, 172 and 174 produced from the three FIGS. 32, 33 and 34 web patterns, respectively. These tiles can be used to define separate regions on a floor with great flexibility. As can be seen in these FIGS. 28-31, the 170, 172 and 174 tiles can be used to create visually separate floor areas that are generally relatively rectilinear in overall shape (e.g., FIG. 28) or other areas having a generally curving shape (e.g., FIG. 29).

While other approaches are possible, carpet tiles in accordance with this invention can be produced as described above in which tiles having visually more complex images may be produced with relatively tall loops of yarn, and tiles having visually less complex images can be produced with relatively short or "low" loops of yarn. This causes the yarn depth in the more visually complex areas, as a general proposition, to have taller pile than the pile height in the visually less complex areas.

As a result, the different regions of the assemblies 50, 56, 64 and 72 may not only look different but may also feel and or sound different under foot, thereby providing further "definition" for the different regions of the assemblies.

In yet another alternative embodiment, carpet tiles in accordance with this invention can be produced as described above in which tiles can be produced with relatively tall loops of yarn and a particular pattern or no pattern, and tiles can be produced with relatively short or "low" loops of yarn in the same pattern as the taller loop pattern or with no pattern. This results in carpet times with differing pile heights that may feel or sound different underfoot while being visually alike.

Carpet tile assemblies of this invention having intended paths or corroders that feel different underfoot can provide subtle but effective guidance to the visually impaired that is visually attractive and practical in accommodating wear and soiling.

Where lower height pile areas coincide with or define higher traffic areas of a carpet tile installation in accordance with the present invention, those lower pile height areas may appear to wear less rapidly than would higher pile areas. Furthermore, because the different areas of some of the carpet tile assemblies in accordance with this invention look different by design and before wear or soiling has begun, wear and soiling during use can be less noticeable if it occurs in areas of the assembly that intentionally look different from the lower traffic areas.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The invention claimed is:

[1. A tufted article, comprising:

a primary backing, yarns tufted into the primary backing to form tufts that protrude from at least one side of the primary backing, wherein:

(a) in at least a first area of a first portion of the article, tufts of a first yarn color having a maximum tuft height are present, (b) in at least a second area of the first portion of the article, tufts of a second yarn color having a maximum tuft height are present, and (c) in at least a third area of the first portion of the article interposed between the first area and second area, progressing from the first area to the second area intermediate tufts of the first yarn color are progressively shorter and intermediate tufts of the second yarn color are progressively taller and wherein intermediate tufts of the first yarn color alternate with intermediate tufts of the second yarn color across at least a portion of the third area.]

[2. The tufted article of claim 1, further comprising tufts of multiple heights of at least a third color yarn in the first portion of the article.]

[3. The tufted article of claim 2, further comprising tufts of multiple heights of at least a fourth color yarn in the first portion of the article.]

[4. The tufted article of claim 1, wherein the article is a carpet tile.]

[5. An installation of a plurality of the carpet tiles of claim 4.]

[6. The installation of claim 5, wherein each of the plurality of carpet tiles comprises a pattern and wherein at least some of the carpet tile patterns in the installation are identical.]

[7. The installation of claim 6, wherein at least two of the carpet tiles with identical patterns are installed in the installation in different rotational orientations.]

[8. The installation of claim 5, wherein at least some of the plurality of carpet tiles are installed in the installation in different rotational orientations.]

[9. The tufted article of claim 1, wherein, in a second portion of the article:

(a) only tufts of the first yarn color are visible adjacent one side of an imaginary boundary line, and (b) only tufts of a second yarn color are visible adjacent the other side of the imaginary boundary line, thereby creating at the imaginary boundary line a discernible demarcation between tufts of the first and second yarn colors.]

[10. The tufted article of claim 9, wherein the article is a carpet tile.]

[11. An installation of a plurality of the carpet tiles of claim 10.]

[12. The installation of claim 11, wherein at least some of the plurality of carpet tiles are installed in the installation in different rotational orientations.]

[13. The tufted article of claim 1, wherein:

i. tufts of the first yarn color progress from the maximum tuft height in the first area to a minimum tuft height in the second area through a progression of at least three different tuft heights, and ii. tufts of the second yarn color progress from a minimum tuft height in the first area to the maximum height in the second area through a progression of at least three different tuft heights.]

[14. A tufted carpet tile having a pattern and comprising:

a. a primary backing, b. first and second yarns tufted into the primary backing to form tufts that protrude from a side of the primary backing, wherein the tufts have a tuft height and wherein:

i. the first and second yarns are different in appearance with respect to at least one characteristic;

ii. a first area of the carpet tile comprises tufts of the first yarns, wherein tufts of the first yarns in the first area comprise a maximum tuft height;

iii. a second area of the carpet tile comprises tufts of the second yarns, wherein tufts of the second yarns in the second area comprise a maximum height; and iv. an intermediate area extends between the first and second areas and comprises tufts of the first and second yarns, wherein the tuft height of the first yarns progressively decreases in the intermediate area from the first area toward the second area and wherein the tuft height of the second yarns progressively increases in the intermediate area from the first area toward the second area and wherein tufts of the first yarn alternate with tufts of the second yarn across at least a portion of the intermediate area.]

[15. The tufted carpet tile of claim 14, wherein the at least one characteristic is color.]

[16. The tufted carpet tile of claim 14, wherein the at least one characteristic is texture.]

[17. The tufted carpet tile of claim 14, wherein the first area comprises no second yarns.]

[18. The tufted carpet tile of claim 14, wherein the first area comprises second yarns having a minimum tuft height less than the maximum tuft height of the first yarns in the first area.]

[19. The tufted carpet tile of claim 18, wherein the second yarns in the first area are not visible in the pattern.]

[20. The tufted carpet tile of claim 14, wherein the second area comprises no first yarns.]

[21. The tufted carpet tile of claim 14, wherein the second area comprises first yarns having a minimum tuft height less than the maximum tuft height of the second yarns in the second area.]

[22. The tufted carpet tile of claim 21, wherein the first yarns in the second area are not visible in the pattern.]

[23. The tufted carpet tile of claim 14, wherein:

i. tufts of the first yarn progress from the maximum tuft height in the first area to a minimum tuft height in the second area through a progression of at least three different tuft heights; and ii. tufts of the second yarn progress from a minimum tuft height in the first area to the maximum height in the second area through a progression of at least three different tuft heights.]

[24. An installation of a plurality of the tufted carpet tiles of claim 14.]

[25. The installation of claim 24, wherein at least some of the carpet tile patterns in the installation are identical.]

[26. The installation of claim 25, wherein at least two of the carpet tiles with identical patterns are installed in the installation in different rotational orientations.]

[27. The installation of claim 24, wherein at least some of the plurality of carpet tiles are installed in the installation in different rotation orientations.]

[28. The tufted carpet tile of claim 14, wherein, in a third area of the carpet tile:

(d) only tufts of the first yarn are visible adjacent one side of an imaginary boundary line, and (e) only tufts of the second yarn are visible adjacent the other side of the imaginary boundary line, thereby creating at the imaginary boundary line a discernible demarcation between tufts of the first and second yarns.]

[29. An installation of a plurality of the tufted carpet tiles of claim 28.]

[30. The installation of claim 29, wherein each of the plurality of carpet tiles comprises a pattern and wherein at least some of the carpet tile patterns in the installation are identical.]

[31. The installation of claim 30, wherein at least two of the carpet tiles with identical patterns are installed in the installation in different rotational orientations.]

*32. A method of making a collection of carpet tiles, each tile comprising a tile face and a first edge having a length, a second edge having a length, a third edge having a length, and a fourth edge having a length, wherein the first and third edges of each tile oppose each other and wherein the second and fourth edges of each tile oppose each other, the method comprising:*

*tufting a plurality of carpet webs such that each of the plurality of carpet webs bears at least one of a first visual field or a second visual field different from the first visual field; and*

*cutting the plurality of carpet webs into the collection of carpet tiles comprising:*

*a. a plurality of first carpet tiles, wherein the tile face of each of the plurality of first carpet tiles comprises a portion of the first visual field extending continuously across the entirety of the tile face of the first carpet tile; and*

*b. a plurality of second carpet tiles, wherein the tile face of each of the second carpet tiles comprises:*

*i. a first portion that comprises a portion of the first visual field, wherein the first portion of the tile face extends along at least a portion of the length of the first edge of the second carpet tile but does not extend along a portion of the length of the third edge of the second carpet tile; and*

*ii. a second portion that comprises a portion of the second visual field that extends along at least a portion of the length of the third edge of the second carpet tile but does not extend along a portion of the length of the first edge of the second carpet tile; and*

*iii. a third portion interposed between the first portion and the second portion so as to extend (a) along a portion of the length of the second edge and the fourth edge of the second carpet tile, (b) continuously between the second and fourth edges of the second carpet tile, and (c) such that at least some of the third portion extends between the second and fourth edges to distance from both the first edge and the third edge of the second carpet tile, wherein the third portion comprises a non-linear transition from the first visual field to the second visual field in a direction from the first portion towards the second portion such that portions of the first visual field and the second visual field are present within the third portion.*

*33. The method of claim 32, wherein the first portion of the tile face of each of the second carpet tiles extends along the entire length of the first edge of the second carpet tile and along only a portion of the length of the second and fourth edges of the second carpet tile.*

*34. The method of claim 32, wherein the second portion of the tile face of each of the second carpet tiles extends along the entire length of the third edge of the second carpet tile and along only a portion of the length of the second and fourth edges of the second carpet tile.*

*35. The method of claim 32, wherein cutting the plurality of carpet webs into the collection of carpet tiles further comprises cutting the plurality of carpet webs into the collection of carpet tiles further comprising a plurality of third carpet tiles, wherein the tile face of each of the third carpet tiles comprises a portion of the second visual field formed via tufting and extending continuously across the entirety of the tile face of the third carpet tile.*

*36. An installation of the collection of carpet tiles made pursuant to the method of claim 32, the first and second carpet tiles of the collection of carpet tiles positioned on a floor adjacent and abutting such that:*

*at least some of the first carpet tiles abut either the first, second, or fourth edge of adjacent second carpet tiles; and*

*at least some of the second carpet tiles abut each other.*

*37. The installation of claim 36, wherein the second or fourth edges of the at least some of the abutting second carpet tiles abut such that the first portions of the abutting second carpet tiles are adjacent, the second portions of the abutting second carpet tiles are adjacent and the third portions of the abutting second carpet tiles are adjacent.*

*38. The installation of claim 36, wherein the plurality of first carpet tiles and the plurality of second carpet tiles comprise a rotational orientation when cut from the plurality of carpet webs and wherein the rotational orientations of at least some of the abutting carpet tiles in the installation are not aligned.*

*39. The installation of claim 36, wherein the at least some first carpet tiles abut at least one other first carpet tile.*

*40. The installation of claim 36, wherein other of the first carpet tiles abut only other first carpet tiles.*

*41. The installation of claim 36, wherein the at least some first carpet tiles abut the first edge of an adjacent second carpet tile.*

*42. An installation of the collection of carpet tiles formed by the method of claim 35, the plurality of the first carpet tiles, the plurality of the second carpet tiles, and the plurality of the third carpet tiles positioned on a floor adjacent and abutting such that:*

*at least some of the first carpet tiles abut either the first, second, or fourth edge of an adjacent second carpet tile;*

*at least some second carpet tiles abut each other; and*

*at least some of the third carpet tiles abut either the second, third, or fourth edge of an adjacent second carpet tile.*

*43. The installation of claim 42, wherein the second or fourth edges of the abutting second carpet tiles abut such that the first portions of the abutting second carpet tiles are adjacent, the second portions of the abutting second carpet tiles are adjacent, and the third portions of the abutting second carpet tiles are adjacent.*

*44. The installation of claim 42, wherein the plurality of first carpet tiles, the plurality of second Carpet tiles, and the plurality of third carpet tiles comprise a rotational orientation when cut from the plurality of carpet webs and wherein the rotational orientations of at least some of the abutting carpet tiles in the installation are not aligned.*

*45. The installation of claim 42, wherein the at least some of the first carpet tiles abut at least one other first carpet tile.*

*46. The installation of claim 42, wherein the at least some of the third carpet tiles abut at least one other third carpet tile.*

*47. The installation of claim 42, wherein no first carpet tile is adjacent a third carpet tile in the installation.*

*48. The installation of claim 42, wherein other of the first carpet tiles abut only other first carpet tiles and wherein other of the third carpet tiles abut only other third carpet tiles.*

*49. The installation of claim 43, wherein:*

*the at least some first carpet tiles abut the first edge of the adjacent second carpet tile; and*

*the at least some third carpet tiles abut the third edge of the adjacent second carpet tile.*

*50. A method of installing on a flooring surface the collection of carpet tiles made pursuant to the method of claim 32, wherein the plurality of first carpet tiles and the plurality of second carpet tiles comprise a rotational orientation when cut from the plurality of carpet webs, the method comprising positioning the plurality of second carpet tiles on the flooring surface such that some of the plurality of second carpet tiles abut at least one of a first carpet tile or another of the plurality of second carpet tiles, wherein the rotational Orientations of at least some of the abutting carpet tiles are different.*

*51. The method of claim 50, wherein the method comprises positioning the plurality of second carpet tiles on the flooring surface such that some of the plurality of second carpet tiles abut other of the plurality of second carpet tiles such that the first portions of the abutting second carpet tiles are adjacent, the second portions of the abutting second carpet tiles are adjacent, and the third portions of the abutting second carpet tiles are adjacent.*

* * * * *